United States Patent
Basol et al.

(10) Patent No.: US 7,399,516 B2
(45) Date of Patent: Jul. 15, 2008

(54) LONG-LIFE WORKPIECE SURFACE INFLUENCING DEVICE STRUCTURE AND MANUFACTURING METHOD

(75) Inventors: Bulent M. Basol, Manhattan Beach, CA (US); George Xinsheng Guo, Mountain View, CA (US)

(73) Assignee: Novellus Systems, Inc., San Jose, CA (US)

(*) Notice: Subject to any disclaimer, the term of this patent is extended or adjusted under 35 U.S.C. 154(b) by 209 days.

(21) Appl. No.: 10/367,111

(22) Filed: Feb. 14, 2003

(65) Prior Publication Data
US 2003/0217927 A1 Nov. 27, 2003

Related U.S. Application Data

(60) Provisional application No. 60/397,110, filed on Jul. 19, 2002, provisional application No. 60/396,452, filed on Jul. 16, 2002, provisional application No. 60/384,509, filed on May 31, 2002, provisional application No. 60/383,070, filed on May 23, 2002.

(51) Int. Cl.
- *B24D 11/00* (2006.01)
- *B32B 3/30* (2006.01)
- *B32B 5/16* (2006.01)
- *B32B 33/00* (2006.01)

(52) U.S. Cl. ............ 428/142; 428/143; 428/168; 428/169; 428/172; 428/328; 428/329; 428/338; 204/224 M; 451/527; 451/528; 451/539

(58) Field of Classification Search ............ 204/224 M; 205/662, 663, 93; 451/527, 528, 533; 428/167, 428/168, 169, 328, 329, 142, 148, 338, 141, 428/143, 150, 156
See application file for complete search history.

(56) References Cited

U.S. PATENT DOCUMENTS 2,194,472 A 3/1940 Jackson ............... 51/298

(Continued)

FOREIGN PATENT DOCUMENTS

DE 42 03 915 2/1993

(Continued)

OTHER PUBLICATIONS

English language translation of JP 2001-25957, Jan. 2001.*

*Primary Examiner*—Ramsey Zacharia
(74) *Attorney, Agent, or Firm*—Knobbe, Martens, Olson & Bear, LLP

(57) ABSTRACT

A top layer comprises a flexible support and a plurality of hard elements anchored in a binder over the flexible support, and a method of forming the same is provided. In one embodiment, certain ones of the hard elements have a contact surface adapted to contact the conductive surface, with the binder being disposed below the contact surface of each of the certain ones of the hard elements. In another embodiment, the top layer comprises a flexible support, a plurality of hard elements are anchored in a binder over the flexible support such that certain ones of the hard elements have a top surface and the binder is disposed below the top surface of each of the certain ones of the hard elements, and a hard material coating is disposed over the plurality of hard elements and the binder, thereby creating a contact surface of the hard material coating at locations corresponding to the top surface of the certain ones of the hard elements.

41 Claims, 16 Drawing Sheets

U.S. PATENT DOCUMENTS

| | | | |
|---|---|---|---|
| 2,292,261 A * | 8/1942 | Albertson | 451/527 |
| 5,360,462 A | 11/1994 | Harmer et al. | 51/295 |
| 5,584,897 A * | 12/1996 | Christianson et al. | 51/295 |
| 5,782,679 A | 7/1998 | Hunter | 451/296 |
| 5,975,988 A * | 11/1999 | Christianson | 451/28 |
| 6,136,043 A | 10/2000 | Robinson et al. | 8/485 |
| 6,174,227 B1 * | 1/2001 | Ishikawa | 451/533 |
| 6,368,198 B1 * | 4/2002 | Sung et al. | 451/443 |
| 6,477,926 B1 * | 11/2002 | Swisher et al. | 451/526 |
| 2001/0019940 A1 | 9/2001 | Agarwal et al. | 451/526 |
| 2001/0046835 A1 * | 11/2001 | Wielonski et al. | 451/533 |

FOREIGN PATENT DOCUMENTS

| | | |
|---|---|---|
| FR | 2 746 689 | 10/1997 |
| GB | 1 360 015 | 7/1974 |
| JP | 2001-025957 * | 1/2001 |

* cited by examiner

LONG-LIFE WORKPIECE SURFACE INFLUENCING DEVICE STRUCTURE AND MANUFACTURING METHOD

RELATED APPLICATIONS

This application claims priority from Provisional Application Ser. No. 60/383,070 filed May 23, 2002, Provisional Application Ser. No. 60/384,509 filed May 31, 2002, Provisional Application Ser. No. 60/396,452 filed Jul. 16, 2002 and Provisional Application Ser. No. 60/397,110 filed Jul. 19, 2002, all incorporated herein by reference.

FIELD

The invention relates to manufacture of semiconductor integrated circuits and, more particularly to a method for planar deposition or etching of conductive layers.

BACKGROUND

Conventional semiconductor devices generally include a semiconductor substrate, usually a silicon substrate, and a plurality of sequentially formed dielectric inter-layers and conductive paths or interconnects made of conductive materials. Copper and copper alloys have recently received considerable attention as interconnect materials because of their superior electromigration and low resistivity characteristics. The interconnects are usually formed by filling copper by a metallization process in features or cavities etched into the dielectric inter-layers. The preferred method of copper metallization is electroplating. In an integrated circuit, multiple levels of interconnect networks laterally extend with respect to the substrate surface. Interconnects formed in sequential interlayers can be electrically connected using vias or contacts.

In a typical interconnect fabrication process, first, an insulating interlayer is formed on the semiconductor substrate. Patterning and etching processes are performed to form features such as trenches and vias in the insulating layer. Then, copper is electroplated to fill all the features after a conductive barrier and a seed layer are deposited. The plating process results in a thick copper layer on the substrate some of which need to be removed before the subsequent step. Conventionally, after the copper plating, CMP process is employed to globally planarize and then reduce the thickness of this excess copper overburden down to the level of the surface of the barrier layer, which is then also removed, leaving conductors only in the features. However, CMP process is a costly and time-consuming process that needs to be reduced.

The adverse effects of conventional material removal technologies such as CMP may be minimized or overcome by employing an Electrochemical Mechanical Processing (EC-MPR) approach for conductor deposition. ECMPR has the ability to provide thin layers of planar conductive material on the workpiece surface, or even provide a workpiece surface with no or little excess conductive material. The term of Electrochemical Mechanical Processing (ECMPR) is used to include both Electrochemical Mechanical Deposition (ECMD) processes as well as Electrochemical Mechanical Etching (ECME), which is also called Electrochemical Mechanical Polishing (ECMP). It should be noted that in general both ECMD and ECME processes are referred to as ECMPR since both involve electrochemical processes and mechanical action.

FIG. 1 shows an exemplary conventional ECMPR system 10, which includes a workpiece-surface-influencing device (WSID) 12 such as a mask, pad or a sweeper, a carrier head 14 holding a workpiece 15 and an electrode 16. Other conventional ECMPR systems include those that have reverse geometry, i.e. WSID is above the workpiece and the workpiece surface faces up.

During ECMD or ECME processes, the WSID 12 may be held in close proximity of the workpiece surface, i.e., no-touch processing, or may mechanically sweep the surface of the workpiece, i.e. touch-processing, while a relative motion is established between the workpiece surface and the WSID.

Surface of the WSID 12 mechanically sweeps the surface of the workpiece 15 while an electrical potential is established, at least during a portion of the total process time, between the electrode 16 and the surface of the workpiece during touch-processing. Channels 18 of the WSID 12 allow a process solution 20 such as an electrolyte to flow to the surface of the workpiece 15. If the ECMD process is carried out, the surface of the workpiece 15 is wetted by a deposition electrolyte, which is also in fluid contact with the electrode 16 and a potential is applied between the surface of the workpiece and the electrode rendering the workpiece surface cathodic. If the ECME process is carried, out, the surface of the workpiece is wetted by the deposition electrolyte or a special etching or electroetching or polishing liquid, which is also in fluid contact with an electrode and a potential is applied between the surface of the workpiece and the electrode rendering the workpiece surface anodic. Thus, etching takes place on the workpiece surface. Very thin planar deposits can be obtained by first depositing a planar layer using an ECMD technique and then using an ECME technique on the planar film in the same electrolyte by reversing the applied voltage. Alternately, the ECME step can be carried out in a separate machine and a different etching electrolyte. This way the thickness of the deposit may be reduced in a planar manner.

Descriptions of various planar deposition and planar etching methods, i.e. ECMPR approaches and apparatus can be found in the following patents and pending applications, all commonly owned by the assignee of the invention: U.S. Pat. No. 6,126,992 entitled "Method and Apparatus for Electrochemical Mechanical Deposition," U.S. application Ser. No. 09/740,701 entitled "Plating Method and Apparatus that Creates a Differential Between Additive Disposed on a Top Surface and a Cavity Surface of a Workpiece Using an External Influence," filed on Dec. 18, 2001, and U.S. application Ser. No. filed on Sep. 20, 2001 with Ser. No. 09/961,193 entitled "Plating Method and Apparatus for Controlling Deposition on Predetermined Portions of a Workpiece". These methods can deposit metals in and over cavity sections on a workpiece in a planar manner. They also have the capability of yielding novel structures with excess amount of metals selectively over the features irrespective of their size, if desired.

The surface of the WSID preferably contains a hard and abrasive material for efficient sweeping, although softer materials may also be used if high planarization efficiency is not necessary for the specific application or the workpiece surface contains materials that are structurally weak. U.S. application with Ser. No. 09/960,236 filed on Sep. 20, 2001, entitled "Mask Plate Design," and U.S. Utility Application filed on May 23, 2002 entitled "Low Force Electrochemical Mechanical Processing Method and Apparatus," that claims priority from application Ser. No. 60/326,087 filed on Sep. 28, 2001, all assigned to the same assignee as the present invention, disclose various workpiece-surface-influencing device embodiments. Fixed abrasive sheets or pads, which are supplied by companies such as 3M and which are commonly used in CMP applications, work efficiently also on WSID surfaces for ECMPR applications. As exemplified in FIG. 2, such abrasive sheets 30 generally comprise abrasive composites 32 that have a discernible precise shape such as pyramidal or cylindrical. The abrasive composite shapes include a plurality of abrasive grains 34 dispersed in a binder 36. The abrasive composite is bonded to a backing layer 38 through some bonding agent or film (not shown).

During a CMP process, the top surface 33 of the abrasive sheet is used to abrade and polish a workpiece surface by pressing the workpiece surface onto the top surface 33 or vice versa. As polishing action continues, the abrasive composite shapes break down slowly and expose unused abrasive grains embedded in the binder. Thus, the height "H" of composite shape shown in FIG. 2 gets smaller and smaller. As the sheet is used for an extended time, the composite shapes further break down and expose more fresh abrasive grains. Eventually, when the height H of the composite shapes is close to zero, the sheet is replaced. As the brief review above demonstrates the so-called "fixed-abrasive pads" described above actually do not permanently fixed within a matrix. In fact, they are designed to slowly break down, exposing a new surface with fresh abrasive particles.

During the process, the wafer surface makes contact with the abrasive particles as well as the matrix material surrounding them. The matrix material is generally a polymeric material. This design of a composite abrasive film is attractive for CMP applications where the polishing products, including the breakdown products of the abrasive film are washed off the surface of the wafer along with the material removed from the surface of the wafer. For an ECMPR process, however, the surface of the WSID touches the wafer surface during film deposition, before all the features or cavities on the wafer surface are filled with the conductor. Due to the constant breaking down of the composite abrasive layer, such abrasive sheets have relatively short lifetime and need to be replaced often, e.g. every 100-1000 wafers. Also constant shedding of minute abrasive grains, matrix or binder pieces into the process solutions may pollute the process solution, and may even get included in the deposited layers, which are undesirable situations.

For ECME applications, similarly, particle shedding by the pads is undesirable. Other materials that may be used on the surface of the WSID structures that make physical contact to the wafer surface during ECMPR include polymeric pads that are commonly used in CMP applications. These polymeric pads are supplied by companies such as Rodel and Thomas West. The polymeric materials, however, are not very durable in electrolytes of ECMPR. They wear in time and shed microscopic polymeric particles, which may in turn get into the copper film that is deposited. Such drawbacks lower throughput of ECMPR process, increase cost of consumables and also adversely affect product consistency.

Therefore, it will be desirable to provide a longer life WSID surface that does not shed harmful particles for ECMPR applications such as ECMD and ECME.

SUMMARY OF THE INVENTION

The invention provides method and apparatus for making and using a workpiece surface influencing device, preferably in an electrochemical mechanical process (ECMPR), in which abrasive particles are anchored onto the workpiece surface influencing device as described herein.

The invention advantageously provides a WSID that minimizes shedding or abrasive grains and the matrix used to hold abrasive grains.

The invention further advantageously provides a WSID that has hard elements each with an outer top surface that has a portion thereof aligned to form a substantially uniform plane.

The invention further advantageously provides a WSID that has hard elements disposed in a binder or anchoring layer, with the binder being removed so that a predetermined gap exists within which is located only the hard elements.

The invention further provides a WSID that has flexibility that allows for uniform contact to occur between the top surface of the WSID and the front surface of the workpiece during a touch ECMPR process.

The invention further advantageously provides a method for making a WSID that has hard elements each with an outer top surface that has a portion thereof aligned to form a substantially uniform plane.

The invention further advantageously provides a method for making a WSID that has hard elements disposed in a binder, with the binder being removed so that a predetermined gap exists within which is located only the hard elements.

The invention further provides a method for making a WSID that has flexibility that allows for uniform contact to occur between the top surface of the WSID and the front surface of the workpiece during a touch ECMPR process.

The above advantages, either singly or in combination, among others, are achieved by various aspects of the present invention.

In one embodiment, a top layer of a workpiece surface influencing device is provided for use in an electrochemical mechanical processing apparatus in which a solution becomes disposed onto a conductive layer on a workpiece and electrochemical mechanical processing of the conductive layer is performed while relative movement and physical contact exists between the top layer and the conductive layer. The top layer comprises a flexible support and a plurality of hard elements anchored in a binder over the flexible support such that certain ones of the hard elements have a contact surface adapted to contact the conductive surface, with the binder being disposed below the contact surface of each of the certain ones of the hard elements.

In another embodiment, the top layer comprises a flexible support, a plurality of hard elements anchored in a binder over the flexible support such that certain ones of the hard elements have a top surface and the binder is disposed below the top surface of each of the certain ones of the hard elements, a hard material coating disposed over the plurality of hard elements and the binder, thereby creating a contact surface of the hard material coating at locations corresponding to the top surface of the certain ones of the hard elements.

In another embodiment, a method of forming an abrasive layer is provided. Initially, a plurality of hard elements are aligned on a removable planar surface, the removable planar surface having a removable binder disposed thereon. The steps of depositing a binder adapted to anchor the hard elements therein over the removable binder and the hard elements, and then moving the removable planar surface away from the removable binder, thereby leaving the removable binder exposed follow. Thereafter, at least some of the removable binder is removed, thereby leaving a top surface of the plurality of hard elements aligned in a plane and exposed above the binder in which each of the plurality of hard elements is anchored.

In another method of forming an abrasive layer, a composite of binder and hard elements is formed. Thereafter follow the steps of depositing the composite on a flexible layer disposed on a rigid support plate and pressing the composite with a removable flat surface to align top surfaces of some of the hard elements against the removable flat surface. The binder is then at least partially cured, thereby anchoring the hard elements in the binder. Then follow the steps of moving the removable flat surface away from at least some of the hard elements and removing some of the binder so that top surfaces of the at least some of the hard elements are cleared of the binder.

BRIEF DESCRIPTION OF THE DRAWINGS

The above and other aspects, features and advantages of the invention are further described in the detailed description which follows, with reference to the drawings by way of non-limiting exemplary embodiments of the invention, wherein like reference numerals represent similar parts of the invention throughout several views and wherein.

DETAILED DESCRIPTION

In the embodiments described herein, a workpiece surface-influencing device (WSID) of the invention is described that has a longer life cycle and other advantages when compared to a conventional WSID. As opposed to the prior art WSIDs, the hard material in the surface of the WSID of the invention is substantially the only material in direct contact with the workpiece surface during the process. The workpiece surface is not intended to be contacted with any binder, any weak polymeric material or other materials that might break off and create particles. As used herein, the terms "workpiece surface," "wafer surface" and the like include, but are not limited to, the surface of the work piece or wafer prior to processing and the surface of any layer formed thereon, including oxidized metals, oxides, spun-on glass, low-k dielectrics, ceramics, etc.

In another aspect, the WSID surface film of the invention contains hard particles that are anchored within a matrix. They are not intended to shed or come out to pollute the process environment. As a result, replacement of a WSID according to the invention occurs when the hard particles that contact the workpiece surface wear away or degrade, rather than in a conventional fixed abrasive pad in which such particles also become removed from the pad to expose other similar particles therebelow. It should be understood however that the term anchored is used herein solely as language to distinguish from conventional fixed abrasive pads, and is not intended to imply in any manner that usage of an abrasive that is anchored within a WSID surface according to the invention is not a fixed abrasive pad in any other context.

In a further aspect, the WSID surface of the invention is flexible, primarily due to the material properties of the binder that is used to anchor the material, abrasive or hard particles that contact the workpiece surface. By flexible, it is meant that, on macro scale, an area of the WSID can move up or down relative to another area of the WSID that is located only a short distance away, which short distance is a relative distance, and one that is preferably gauged in terms of the maximum feature width. Thus, while vertical relative movement of one area of the WSID to another area of the WSID is not preferred for distances that are less than a maximum feature width, relative vertical movement of one area of the WSID to another area of the WSID distances for distances that are greater than the maximum feature width can be desired, and it may be desired to have the relative vertical movement occur at distances that are a multiple, such as 2 or 5, of the maximum feature width. This provides uniform contact between the hard particles that are anchored and contact the workpiece surface, and the front surface of the wafer during a touch process stage.

Figure 1:
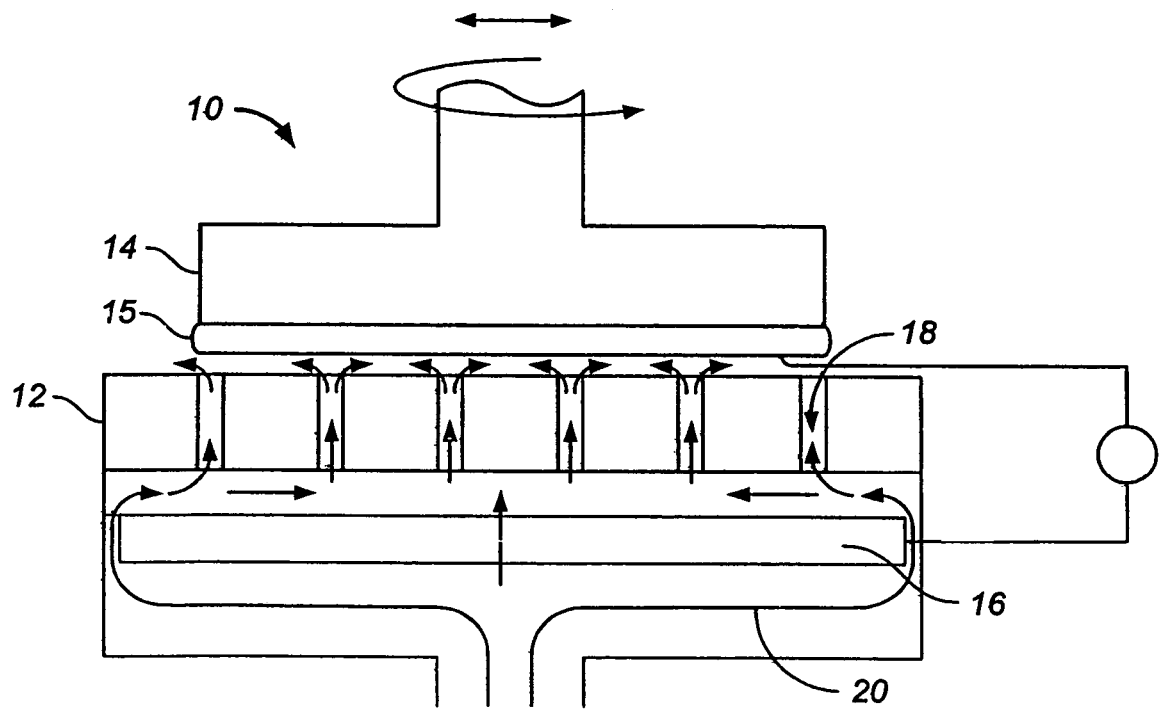
FIG. 1 illustrates a portion of an ECMPR system in which the invention operates.
Figure 2:
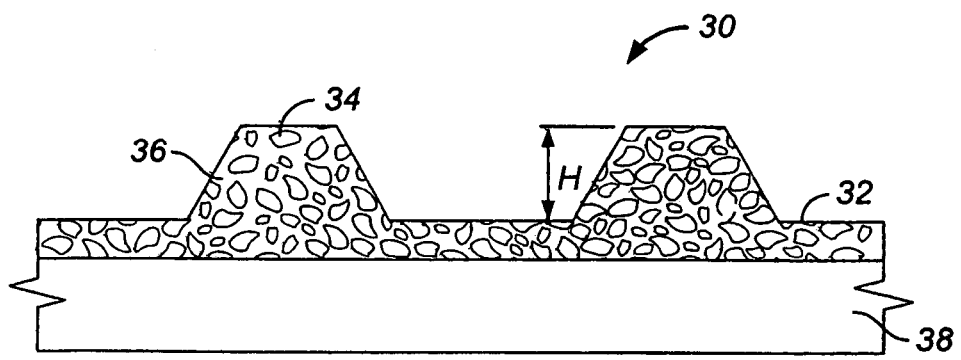
FIG. 2 illustrates an exemplary conventional fixed abrasive pad.
Figure 3A:
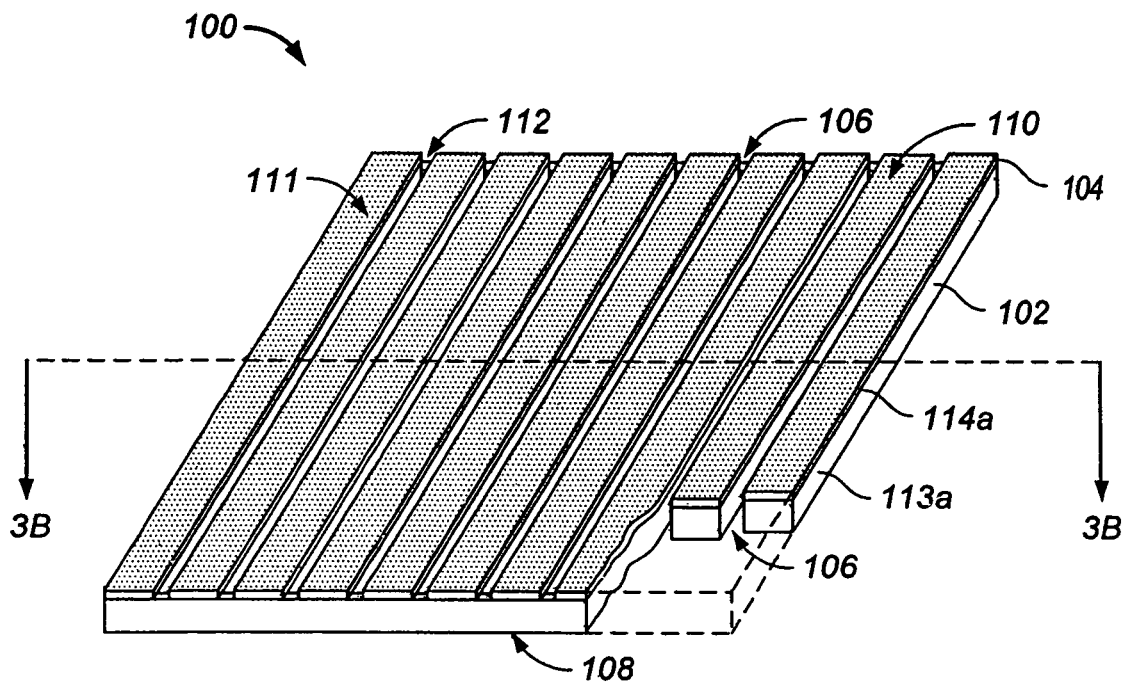
FIGS. 3A-3C illustrate an embodiment of a WSID of the invention.
Figure 3B:
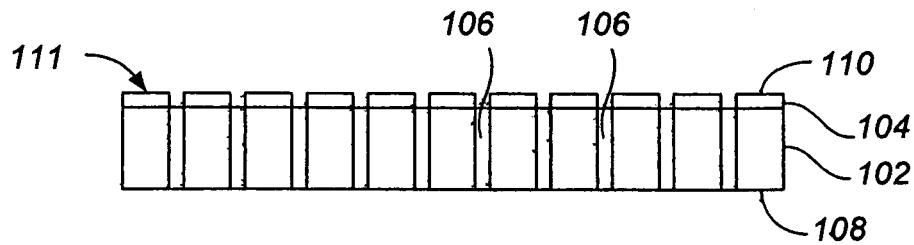

Reference will now be made to the drawings wherein like numerals refer to like parts throughout. FIGS. 3A and 3B show an embodiment of a WSID 100 of the invention, which may be used with the system shown in FIG. 1. As shown in FIGS. 3A and 3B, the WSID 100 may comprise a bottom layer 102 and a top layer 104. The top layer 104 is preferably attached to the bottom layer 102. A plurality of channels 106 or openings are formed through the layers 102, 104. The channels extend from a bottom surface 108 of the bottom layer 102 to a top surface 110 of the top layer 104. As will be described more fully below, top surface 110 of the top layer 104 comprises hard elements 111. Channels 106 may be formed in various shapes and sizes. In this embodiment, channels 106 may be shaped as slits or apertures that are formed through the thickness of the top and bottom layers 102, 104. The channels have a top opening 112 formed in the top layer 104.

During ECMD or ECME processes, a process solution flows through the channels 106 and wet the front surface of the wafer while the wafer is moved and rotated relative to the WSJD in touch or no-touch processing positions. As shown in FIG. 3A, channels 106 may be formed as parallel slits amongst the strips 113a, 114a of the bottom and top layers 102, 104 respectively. Although the width of the bottom and top layer strips 113a, 114a are shown as equal in FIG. 3A, the width of the top layer strips 114a may be narrower than the width of the bottom layer strips 113a, thereby resulting in wider top openings in the top layer 104. Alternately, the width of the top layer strips 114a may be larger than the width of the bottom layer strips 113a, resulting in narrower top openings.

Figure 3C:
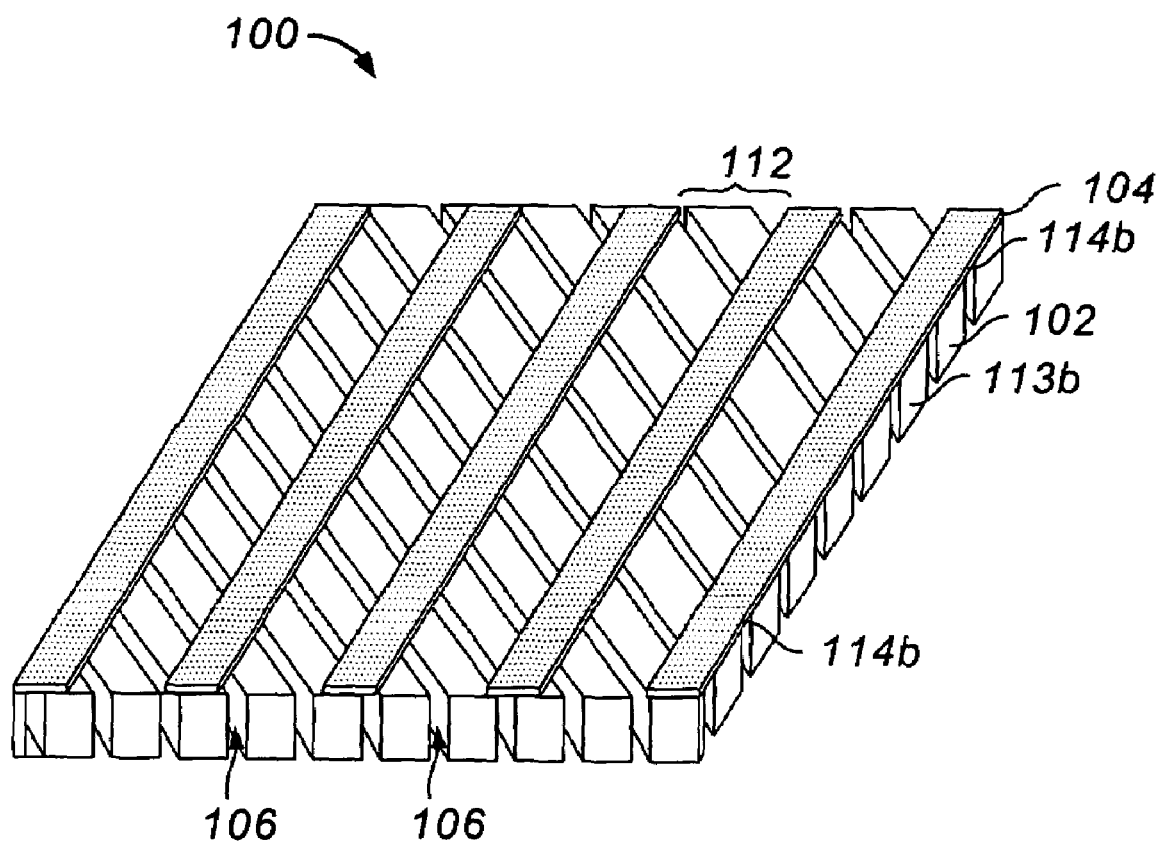

FIG. 3C shows another example of the WSID 100 where the top layer strips 114b are attached to the bottom layer strips 113b in a cross-hatch or mesh configuration. In this configuration, process solution flows through the channels 106 and the top openings 112 before wetting the wafer surface. The cross-hatch structure allows for a more rigid and stable top layer as the top layer makes contact with the wafer during a touch process stage.

Reference is made to U.S. Utility Application filed on May 23, 2002 entitled "Low Force Electrochemical Mechanical Processing Method and Apparatus," that claims priority from application Ser. No. 60/326,087 filed on Sept. 28, 2001 mentioned above. The bottom layer 102 of the WSID 100 may be made of a spongy material such as polyurethane. The bottom layer and hence the WSID 100 may be supported by a rigid and perforated support plate (not shown).

Figure 4A:
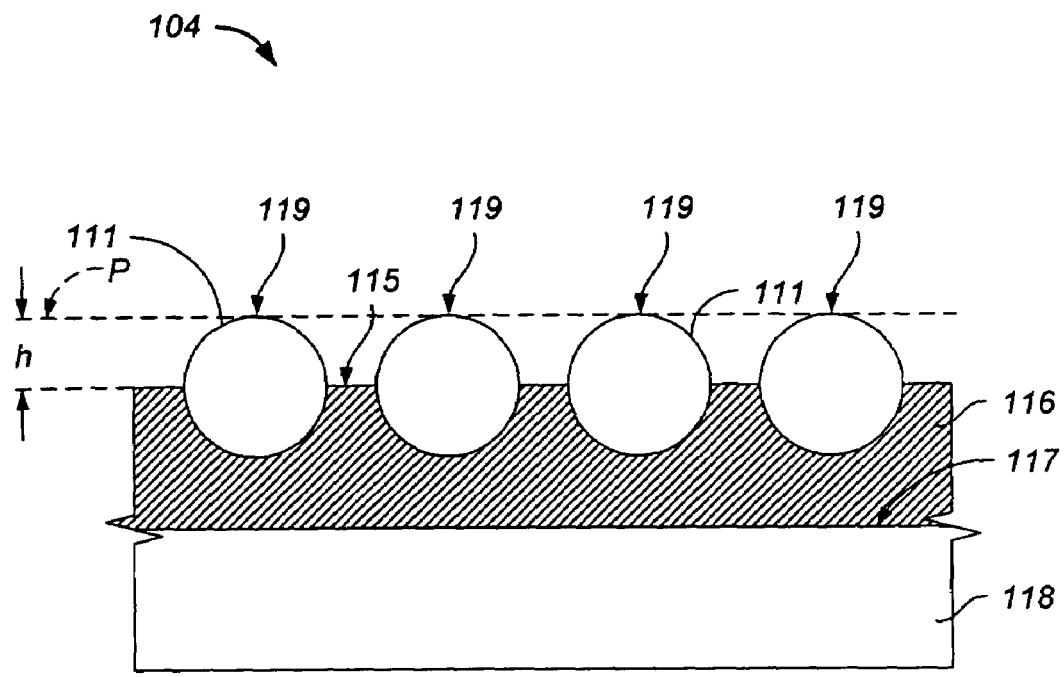
FIGS. 4A-4B illustrate an embodiment of the WSID of the invention using spherical hard elements anchored in a binder.
Figure 4B:
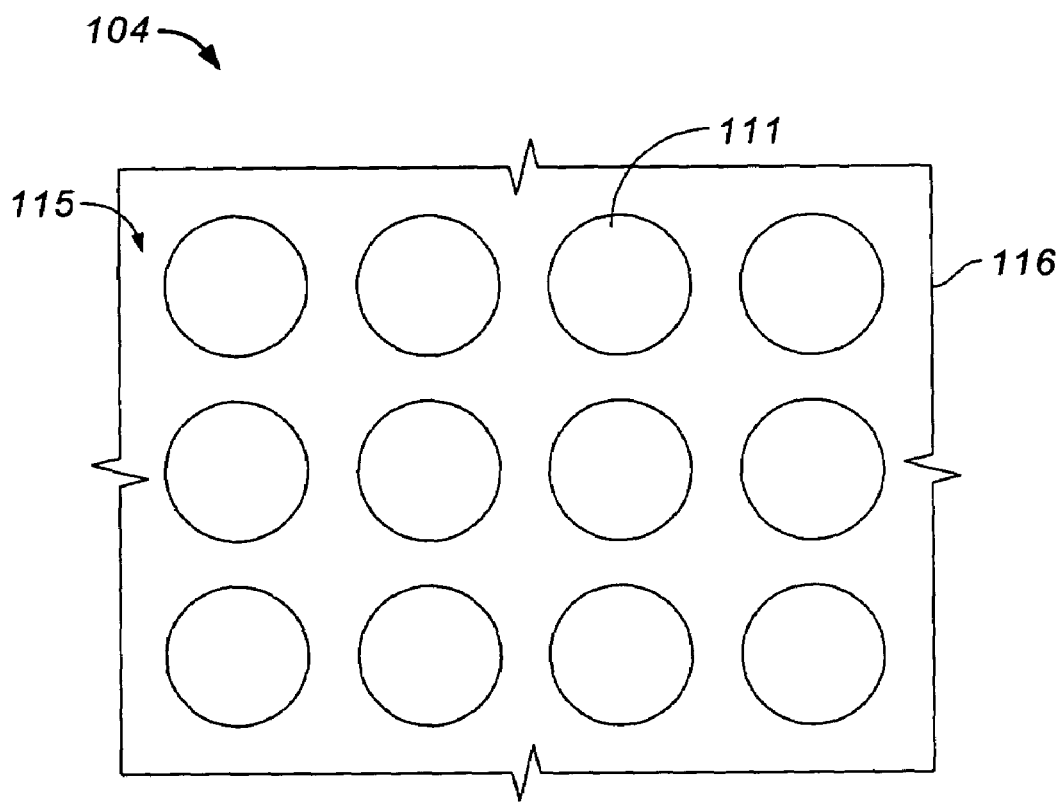

As shown in FIGS. 4A and 4B, the top layer 104 may be comprised of an adhesive layer 116 disposed on top surface 117 of a support layer 118. The hard elements 111 are partially embedded in, and are bonded to, the adhesive layer 116 in order to be anchored therein. The adhesive layer may be made of any adhesive material having good adhesion and chemical resistance such as acid resistance, if used in acidic process solution, and should preferably have certain mechanical flexibility. Although in the preferred embodiment an epoxy is used as the adhesive layer, any polymeric material such as polyamide, polycarbonate or Mylar® can also be used. Preferably, if the adhesion of the adhesive layer to the hard elements is good and its resistance to the chemical environment of the process is high. Alternatively, Teflon® or a thin layer of a ceramic material such as $SiO_2$, $Al_2O_3$, SiN may also be used. There may additionally be hard particles in the adhesive layer (See FIGS. 7B and 7C). A preferred thickness of the adhesive layer, particularly in this embodiment, is at least one half of the average size of the hard element 111. The support layer may be made of a material that provides adequate flexibility, strength, thickness uniformity and strong adhesion, affinity for the adhesive layer. A preferred thickness for the support layer is 10-500 microns. An example of the support layer is a flexible Kapton® foil/sheet. The support layer can also be part of adhesion layer. Alternatively, no separate support layer may be used. Although a preferred material for the hard elements is zirconia, the hard elements may also comprise materials such as alumina, silica, or the like, etc. The exemplary spherical hard elements 111 of FIGS. 4A and 4B may have a diameter of approximately 0.005 to 0.5 millimeters, preferably 0.05 to 0.3 millimeters. As will be discussed below, much finer hard elements may also be used.

It will be appreciated that the combination of both the hardness of the hard elements and flexible nature of the adhesive and support layers make the top layer of the invention superior. Because of the fact that the individual hard elements are distributed on top of flexible bi-layer of the top layer, flexibility of the top layer is very minimally affected when the top layer is flexed. Thus, whether the cross-hatch structure illustrated in FIG. 3C or the structure illustrated in FIGS. 3A-3B is used, the flexibility of the WSID, caused by the flexibility of the various layers, including the flexibility of the top layer 104, allows for uniform contact to occur between the hard elements 111 on the top surface 110 of the top layer 104 and the front surface of the wafer.

The hard elements 111 may be either orderly as in the present embodiment, or close packed or randomly distributed on top surface 115 of the top layer 104. Preferably, the hard elements 11 are shaped and distributed such that process solution can flow amongst them. Height h of the hard elements is the vertical distance between a plane P, that is formed by their uppermost ends 119, and the top surface 115 of the adhesive layer 116. The hard elements 111 contact the wafer surface along the plane P, which will be referred to as contact plane, during the touch plating or etching. Uppermost ends of the hard elements are leveled so that the contact plane is substantially parallel to the top surface 117 of the support layer 118. Leveling of the hard elements with respect to contact plane will be further described below. Preferably the h height of the hard elements is less than or equal to its radius.

Although it is preferred to have same size hard elements, a less than 35% size variation, or a less than 20% size variation is in acceptable limits. A small size variation rate ensures that all the hard elements are attached to the adhesive layer, and further ensures that the top surface 115 of the adhesive layer is below the contact plane, for example at least 10 microns below the contact plane for an exemplary hard element size of 50-100 microns. Preferably, during the process, the workpiece or the wafer surface should not touch the adhesive layer surface or other polymeric or softer materials in the structure of the WSID that may shed. Typical adhesives are not wear resistant and cause particulates if the wafer touches the top surface of the adhesive layer. It is also preferred that at least 5%, preferably more than 50% of the surface area of a hard element should be adhered to the adhesive layer to assure that hard element does not fall off the surface of the adhesive layer.

As mentioned before, the uppermost ends of the hard elements must be substantially leveled at the contact plane. This in fact is preferred for the smoothness of the mechanical sweeping action that is performed during the touch process stage. The hard elements 111, the adhesive layer 116 and the support layer 118 constitute the top layer 104 of FIGS. 4A and 4B (Also see FIGS. 7A-7F). There may additionally be an adhesive layer (not shown) under the support layer 118 that facilitates attachment of the top layer 104 to the bottom layer 102 of the WSID (See FIG. 3A).

Figure 5:
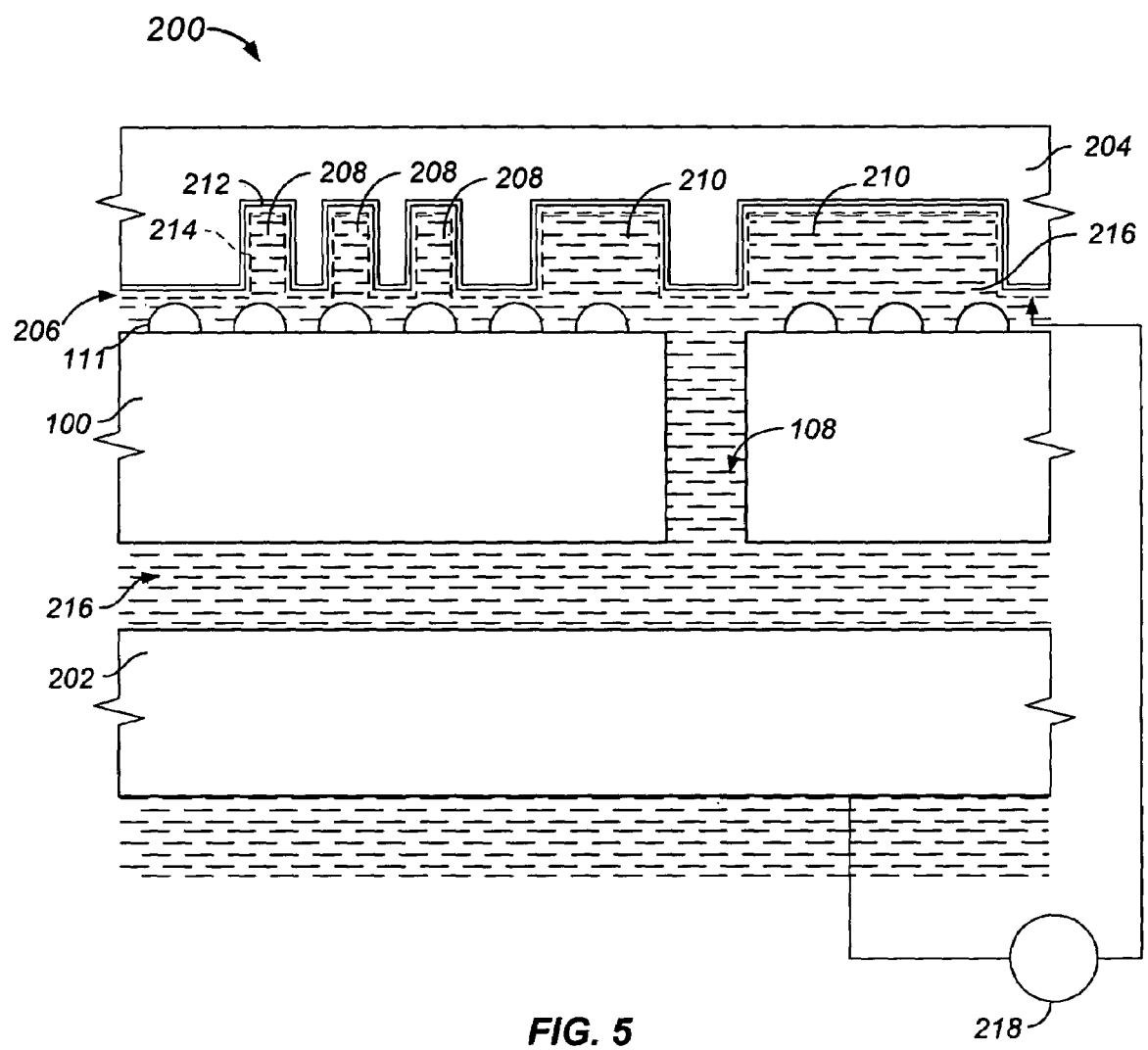
FIG. 5 illustrates a partial view of the WSID of the invention in an ECMPR system that is partially depicted.

Functionality of the WSID 100 of the invention may be described with help of FIG. 5, which shows a partial view of the WSID 100 in an ECMPR system 200 that is partially depicted. As seen in FIG. 5, the WSID 100 is interposed between an electrode 202 and a substrate 204, such as a semiconductor wafer, to be processed. A front surface 206 of the substrate 204 may for example be preprocessed for a subsequent ECMD copper plating process step. Features such as vias 208 and trenches 210 may be formed in the front surface 206 of the substrate and they may be lined with a barrier layer 212 and then a copper seed layer 214. The front surface 206 may alternatively comprise a copper overburden layer (not shown) to be etched down using an ECME process. A process solution 216 fills the space between the front surface 206 and the electrode 202 by flowing through the channels 108 of the WSID of the invention. The process solution 216 may be a plating solution for either the ECMD or ECME processes or may be an etching or polishing solution for the ECME process. During the process, a voltage, which may be variable or constant, is applied between the front surface of the wafer and the electrode 202 through a power source 218. As the voltage is applied, the wafer, which is at the proximity of the WSID, is swept by the hard elements 111 of the WSID, as the wafer 204 or the WSID is rotated and moved laterally. As the relative motion occurs between the wafer and the WSID, the hard elements contact with the front surface of wafer and sweep the surface.

It should be noted that, in the present WSID structure preferably only the surface of the hard elements touches the surface of the wafer and the hard elements are anchored, i.e. they are not intended to come out or shed, though in practice some limited number of particles may, particularly after the WSID nears the end of its intended life. The hard elements 111 are made of hard materials that are substantially harder than the materials to be deposited on or removed off the wafer surface. For example, for copper deposition, the hard elements 111 may be made of insulating and conducting materials such as oxides of zirconium, aluminum, cerium and silicon, diamond, nitrides or oxy-nitrides of titanium and tantalum, carbides of silicon and titanium, or composites or alloys of such hard materials. Hard stainless steels may also be used, however, if the hard elements 111 are made of a conductive material, deposition of copper on the hard elements needs to be minimized or prevented.

Figure 6A:
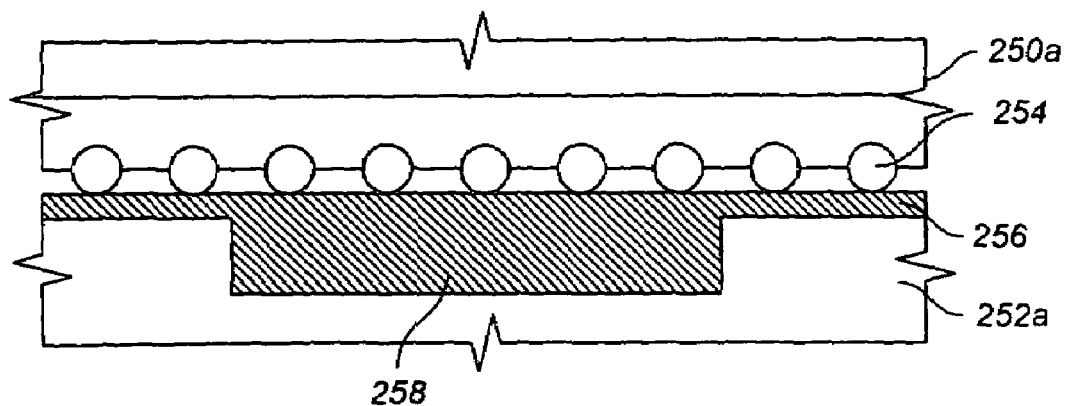
FIGS. 6A-6B illustrate a leveled and a non-leveled WSID operating on the top layer of a workpiece.
Figure 6B:
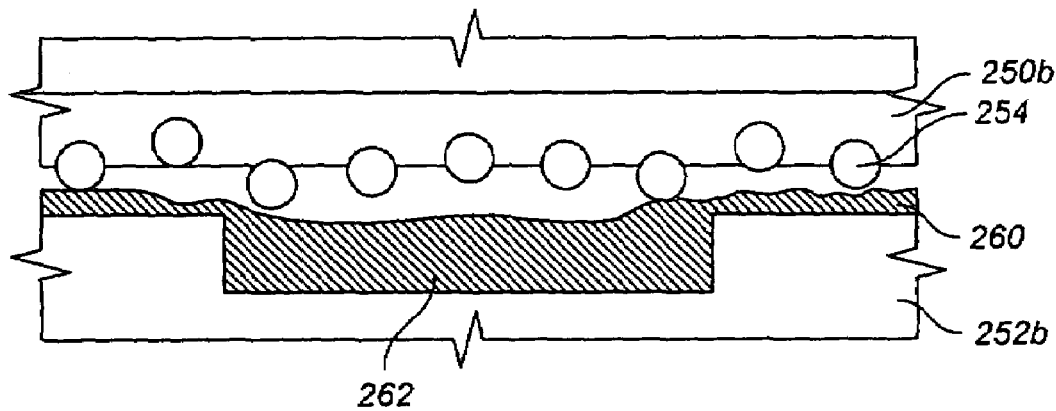

FIGS. 6A and 6B compare a leveled top layer 250a with a non-leveled top layer 250b as the top layers 250a, 250b are used during touch processing, for example ECMD processing of substrates 252a and 252b. It is understood that the leveled top layer 250a includes hard elements 254, whose uppermost ends form a substantially flat contact plane, which is described above. The non-leveled top layer 250b includes hard elements 254 with upper most ends having varying elevations, thereby not having a substantially flat contact plane. As shown in FIG. 6A, as a layer 256 of copper is deposited on the substrate 252b and into a feature 258, e.g. a trench, by ECMD process, the leveled top layer 250a touches the surface of the substrate 252b in a sweeping manner as a relative motion is established between the substrate and the top layer 250a. The leveled top layer 250a forms a planar copper layer because all the hard elements contact the surface of the copper layer at the same time and same level. FIG. 6B shows the exemplary substrate 252b having a feature 262. The surface of the substrate 252b includes a copper layer 260. As shown in FIG. 6B, unevenness of the non-leveled top layer 250b of the WSID, causes a non-uniform interaction between copper layer and the hard elements 254. As a result, copper layer 260 may have a non-planar or scratched surface. As shown in FIG. 6B, a dishing effect over features 262 is observed, since tops of the non leveled hard elements sag into the features.

In the preferred embodiment, although the hard elements are shaped as spheres, in general, hard elements may have different three-dimensional geometrical shapes, such as multi faceted or cylindrical shapes, with differing sizes. Further, the adhesive layer may also be formed in varying profiles. FIGS. 7A-7F exemplify various hard element shapes and sizes and adhesive layer profiles. It is understood that in all of the below embodiments, hard elements are firmly anchored by the adhesive layer, thus their removal from the adhesive layer, during the process, is unintended and almost impossible. As mentioned before, the uppermost ends of the hard elements must be substantially leveled in contact plane of the top layer. Hard elements contact a wafer surface along the plane P or contact plane during the touch electroplating or touch electroetching. Uppermost ends of the hard elements are such leveled that the contact plane is preferably substantially parallel to the top surface of the support layer. The top surface of the adhesive layer is below the contact plane and the distance among the hard elements is such that during a process a wafer surface does not touch the adhesive surface or other softer materials in the structure of the WSID that may shed and create unwanted particulates in the process solution. As described above such particulates intervene with the process and cause defects in the deposited or the etched layer.

Figure 7A:
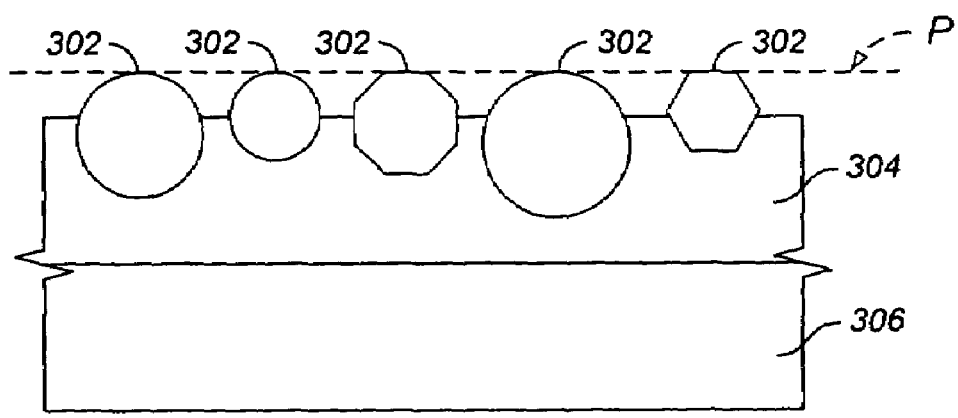
FIGS. 7A-7F illustrate various hard element shapes, sizes and adhesive layer profiles according to the invention.

FIG. 7A exemplifies a top layer 300 comprising hard elements 302 that are anchored to an adhesive layer 304 which is disposed on a support layer 306. Although the top layer 300 includes hard elements having different shapes and sizes, uppermost ends of them level with the contact plane P of the top layer 300.

Figure 7B:
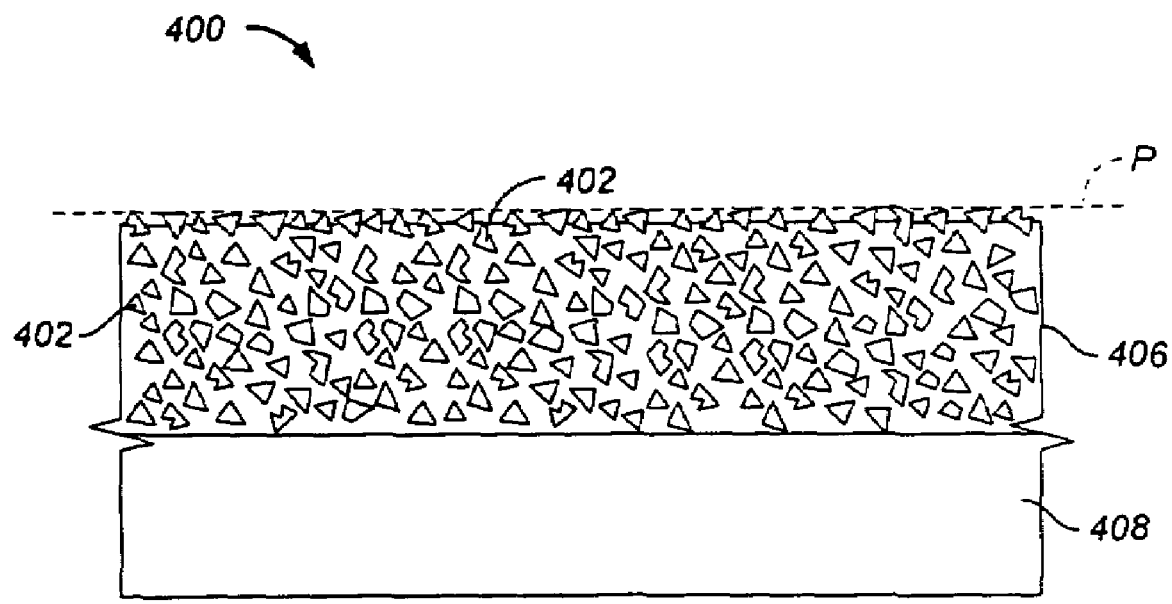

FIG. 7B exemplifies a top surface 400 comprising hard particulates 402 bonded to the top surface 400 and distributed into an adhesive layer 406 which is disposed on a supprt layer 408. The hard p articulates that are distributed into the matrix of the adhesive layer 406 mechanically reinforce the adhesive layer while the hard particulates 402 anchored to the top surface 400 contact the wafer or substrate surface (not shown). Although it is not necessary, the hard particulates 402 in this and the below embodiments may be smaller than the hard elements shown in other embodiments and may be made of the same materials as the hard elements. An exemplary particulate size may be 0.1-5 microns. Uppermost ends of the hard particulates 402 level with contact plane P.

Figure 7C:
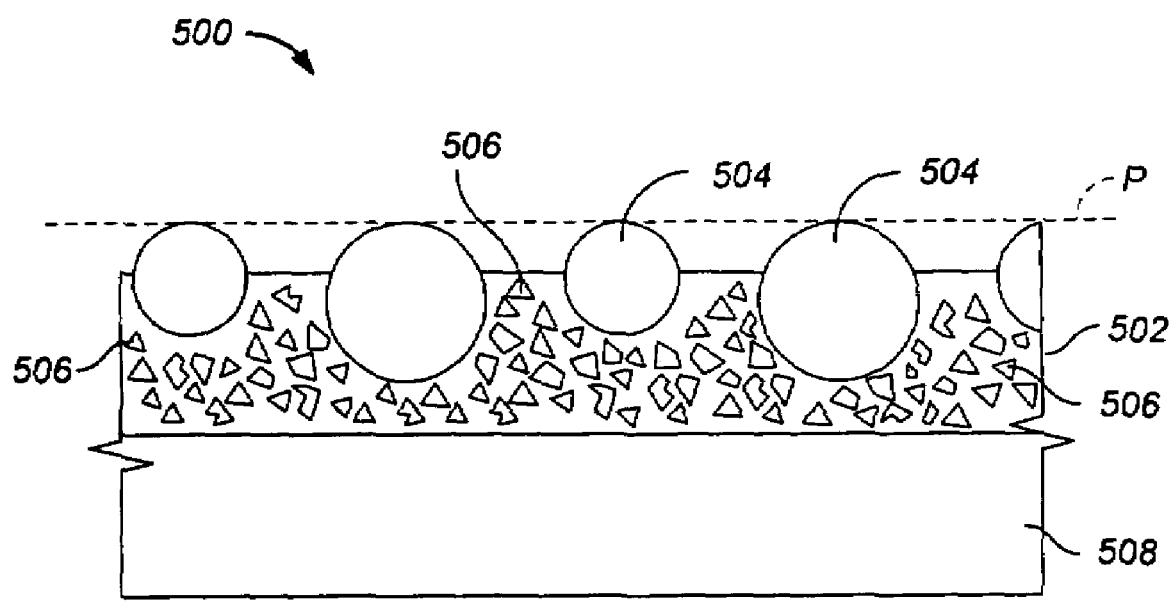

FIG. 7C, exemplifies a top surface 500 having an adhesive layer 502 that comprises hard elements 504 together with hard particulates 506. The hard particulates 506 are distributed in the adhesive layer 502 to reinforce the adhesive layer 502. Alternately, in this and the other embodiments, hard elements 504 may also be distributed in the matrix of the adhesive layer with or without hard particulates 506. The adhesive layer 502 is disposed on a support layer 508. Uppermost ends of the hard elements 504 level with contact plane P.

Figure 7D:
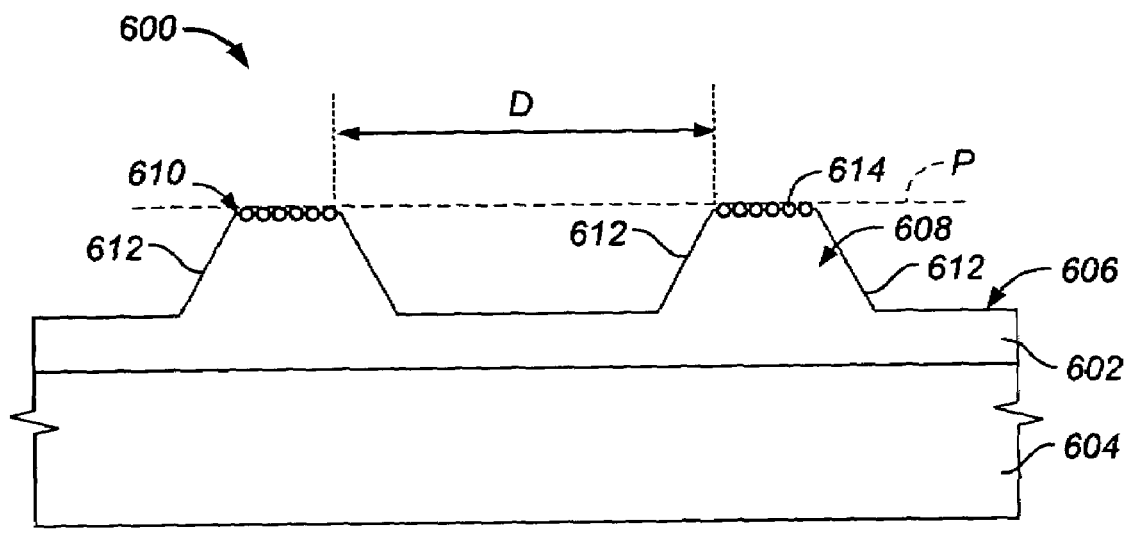
Figure 7E:
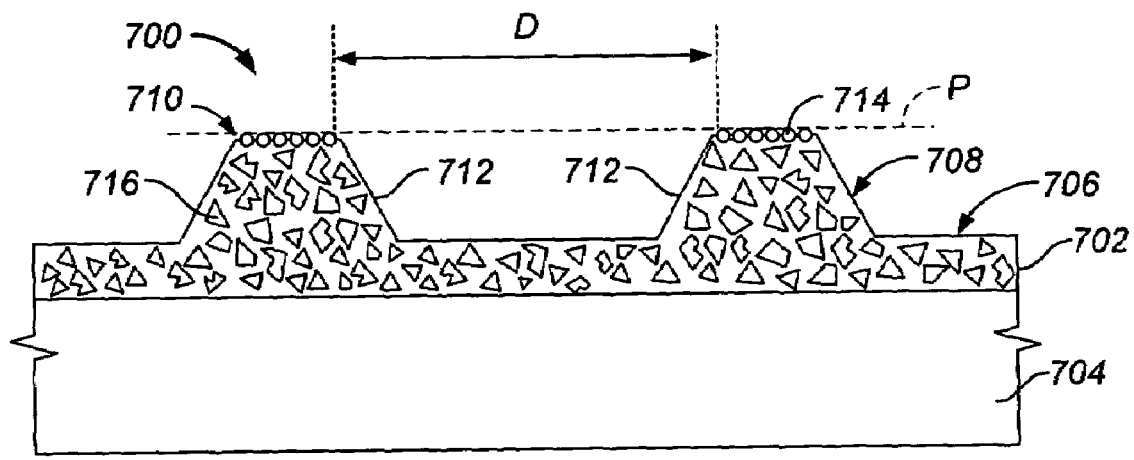
Figure 7F:
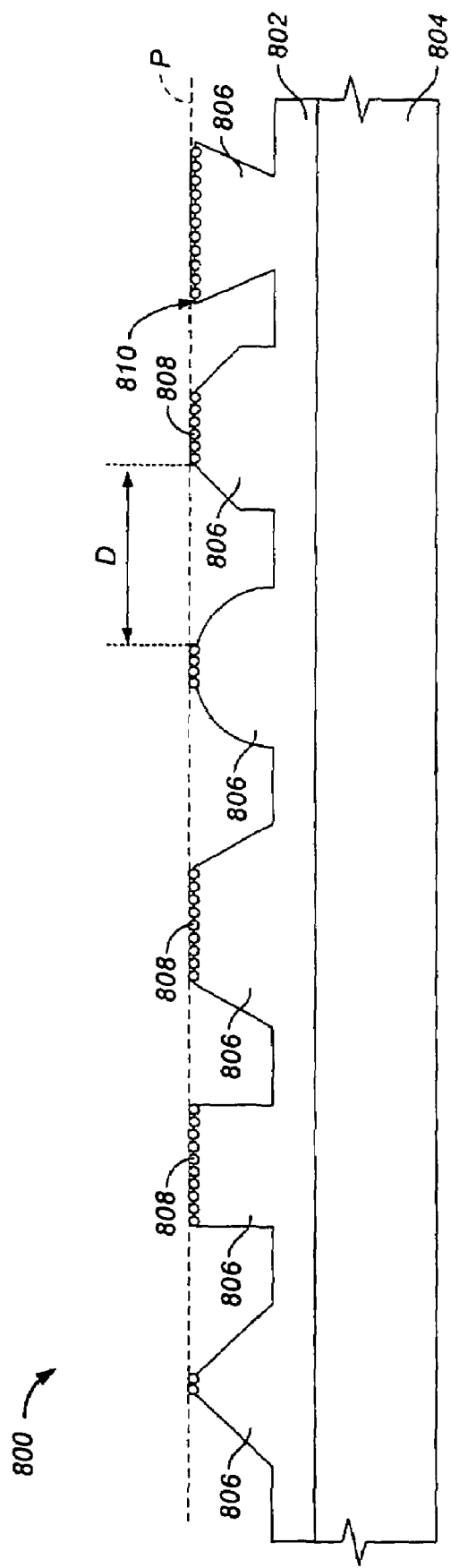

FIGS. 7D-7F exemplifies top surfaces having various adhesive layer profiles. FIG. 7D exemplifies a top layer 600 having an adhesive layer 602 that is disposed on a support layer 604. The top surface 606 of the adhesive layer 602 may be shaped to have protrusions 608. The protrusions 608 preferably have a trapezoid shape having an upper surface 610 and side surfaces 612. The hard elements 614 are anchored to the upper surface 610 of the protrusions 608. Uppermost ends of the hard elements 614 on each protrusion 608 level with contact plane P. The distance 'D' between the protrusions is such arranged that a wafer surface only contacts the hard elements 614 on the protrusions 608. A channel, such as the channel 106 illustrated in FIG. 3A can be arranged in the area illustrated by the distance "D" between protrusions 608.

FIG. 7E exemplifies a top layer 700 having an adhesive layer 702 that is disposed on a support layer 704. The top surface 706 of the adhesive layer 702 may be shaped to have protrusions 708. The protrusions 708 preferably have a trapezoid shape having an upper surface 710 and side surfaces 712. The hard elements 714 are anchored to the upper surface 710 of the protrusions 708. Hard particulates 716 are distributed into the adhesive layer 702 including the protrusions 708, and reinforce the adhesive layer. Alternatively the hard elements at the upper surface 710 may be replaced with the hard particulates. Uppermost ends of the hard elements 714 or, if alternatively used, the hard particulates 716, on each protrusion 708 level with contact plane P. The distance 'D' between the protrusions 708 is such arranged that a wafer surface only contacts the hard elements on the protrusions 708. The distance D may range from 0.01 mm to 2 mm. Preferably it is in the range of 0.05-0.2 mm.

As exemplified in FIG. 7F, which is similar to FIG. 7E, a top layer 800 may comprise an adhesive layer 802 that is disposed on a support layer 804. In this embodiment, the adhesive layer 802 may comprise protrusions 806 having different shapes shown in FIG. 7F. Alternately, top surface may be formed using any of the individual shape shown in FIG. 7F. Hard elements 808 are anchored to upper surfaces 810 of the protrusions 806 and level with the contact plane P. The adhesive layer 802 may include hard particulates for the purpose of reinforcement. Alternatively, as in the previous embodiment, the hard elements 808 at the upper surfaces 810 may be replaced with the hard particulates. The distance 'D' between the protrusions is such arranged that a wafer surface only contacts the hard elements 808 on the protrusions 806.

During the manufacturing of a top layer for a WSID, after forming the adhesive layer 802 on a support layer, the hard elements 808 can be directly applied on the adhesive layer 802, or they can be applied through a mask having desired top opening pattern of the channels. In either way, in a subsequent step, a desirable pattern of openings is formed by cutting the top layer 800. The hard elements 808 are preferably located near the top surface of the adhesive layer 802 although some may also be embedded in the adhesive layer. Any adhesive smear on the top surface of the hard elements 808, where a wafer surface may be contacted during processing, should be cleaned off carefully to ensure that wafer surface is contacted principally by the hard elements 808. Preferably, a substantial portion of the body of each hard element 808 should be immersed inside adhesive layer 802 to ensure adequate bonding force between the adhesive and the hard elements. A pressure should be applied on the hard elements 808 while the adhesive is dried and cured.

Figure 8A:
FIGS. 8A-8F illustrate a method of making a WSID according to the invention.
Figure 8B:
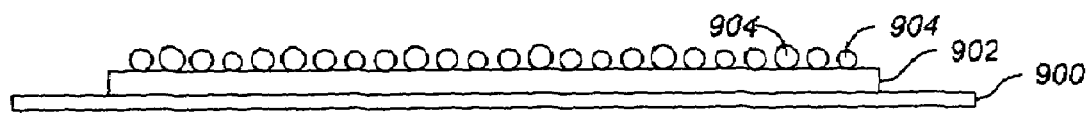
Figure 8C:
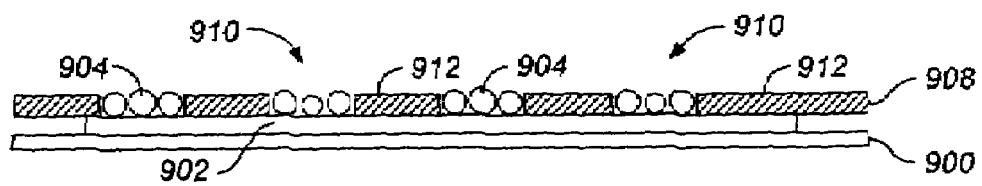

In an exemplary top layer manufacturing process, as shown in FIG. 8A, initially, an adhesive layer 902 is disposed on top of a support layer 900 to form a top layer. As shown in FIG. 8B, a plurality of hard elements 904 are distributed on the adhesive layer before the adhesive layer solidifies. As further shown in FIG. 8B, the hard elements 904 may have different sizes. The hard elements 904 may be placed on the adhesive layer 902 to form a single blanket layer or may be patterned through a mask or mold that has a desired WSID opening pattern. FIG. 8C exemplifies a mask 908 having the desired channel pattern, which may be comprised of openings 910 and solid portions 912. The solid portions 912 cover the places where channel top openings are located on the top layer. The hard elements 904 are disposed onto the adhesive layer 902 through the openings 910 of the mask 908 to form a top layer.

Figure 8D:
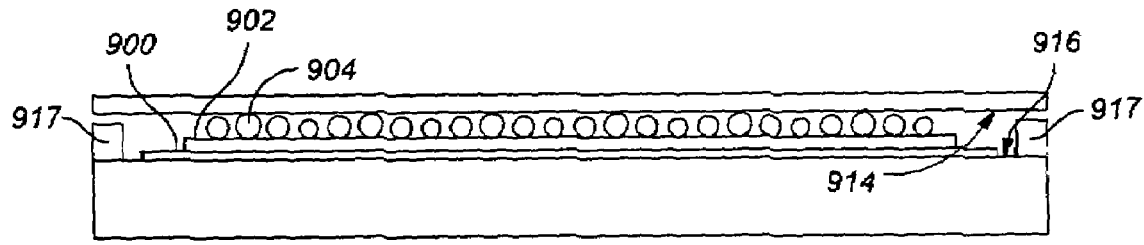
Figure 8E:
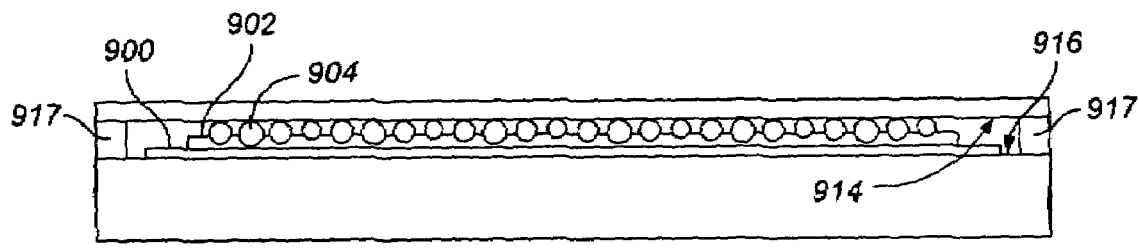

As shown in FIG. 8D, once the hard elements 904 are disposed in the structure as shown in FIG. 8B, the resulting structure is compressed in a leveling step between the surfaces 914, 916 of a leveling structure. The surfaces 914, 916 are substantially parallel, flat and smooth. As shown in FIG. 8E, compressive force applied by the surface 914 pushes the hard elements 904 into the adhesive layer 902 and aligns them across a flat contact plane. At this stage, use of spacers 917 adjusts the 'h' distance of the hard elements 904 (See also FIG. 4A). Alternatively, the spacers 917 can be permanently attached to the leveling structure that uses surfaces 914, 916. The h distance is the vertical distance between the surface of the adhesive layer 902 and the contact plane established by the uppermost ends of the hard elements. Use of spacers 917 more importantly assures that the contact plane of the hard element is substantially parallel to the top surface of the support layer 900. The contact plane was described above. The contact plane provides a substantially uniform force during polishing and prevents scratching or dishing of the deposition layer or the layer from which material is being removed, as applicable. If the mask 908 shown in FIG. 8C is used, the mask can also serve as a spacer between adhesive layer 902 and the surface 914 that presses on the hard elements. This will ensure that the surface of the adhesive layer 902 is well below the contact plane. Alternatively, the hard elements can also be first weakly bonded to a temporary adhesive layer which may be formed on a flat surface. The hard elements are then transferred to the adhesive layer by pressing this temporary adhesive layer against the adhesive layer, and then removing the temporary adhesive layer.

Figure 8F:

As shown in FIG. 8F, once the hard elements are attached to the adhesive layer, the adhesive layer is dried and cured either at room temperature or at elevated temperatures in a shortened time period so that the hard elements are then fully anchored. After curing the adhesive layer, channel patterns can be cut into the polishing film if desired.

Figure 9A:
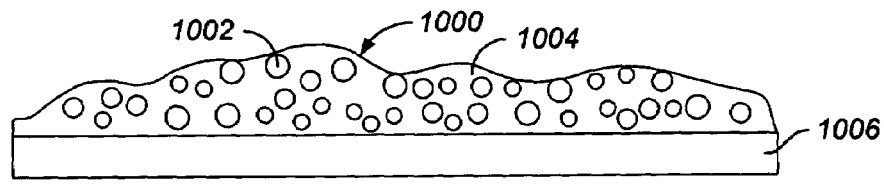
FIGS. 9A-9E illustrate another method of making a WSID according to the invention.

As shown in FIGS. 9A-9E, in an alternative top layer manufacturing method, as shown in FIG. 9A, initially, an adhesive mixture layer 1000 including a plurality of hard elements 1002 mixed with an adhesive 1004 is disposed on top of a support layer 1006. In this embodiment, hard elements 1002 are mixed and distributed in the adhesive. As in the previous embodiment, hard elements 1002 may vary in size and shape or may be the same size and shape. In one embodiment, the hard elements 1002 are spherical with smooth surfaces, e.g. <0.5 microns surface roughness. The mixture layer 1000 of adhesive 1004 and hard elements 1002 may be placed on the support layer 1006 as a single blanket layer or patterned through a mask or mold that has a desired WSID opening pattern as in the previous embodiment (see FIG. 8C).

Figure 9B:
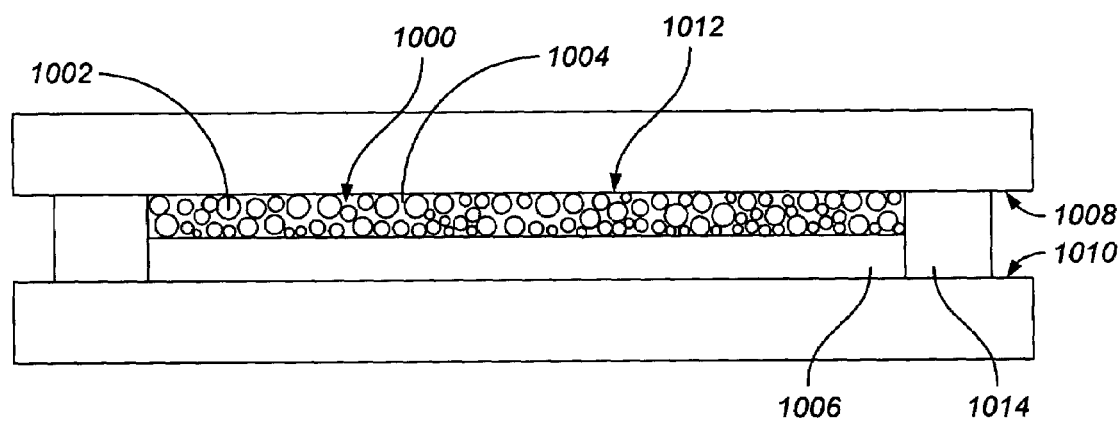
Figure 9C:
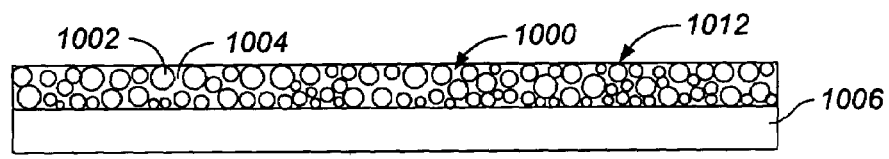

As shown in FIG. 9B, the adhesive mixture layer 1000 is then compressed in a leveling step between surfaces 1008 and 1010 which are substantially parallel, flat and smooth. Compressive force applied by the surface 1008 ensures a flat contact plane for the hard elements in the mixture layer and provides a flat surface 1012, which is shown in FIGS. 9B and 9C. Use of spacers 1014 ensures that the mixture is well compacted and is brought down to a predetermined thickness. The hard elements 1002 in the mixture layer 1000, under the compressive force, form a porous network, which is filled with adhesive material. Uppermost hard elements in this structure are leveled with the surface 1008. The mixture is then dried and cured either at room temperature or at elevated temperatures in a shortened time period so that the hard elements are fully anchored. Surface 1008 is removed either before or after this curing period, preferably after the curing period. It should be noted that the surface 1008 is made of a material that does not adhere to the adhesive mixture 1000, thus can be easily removed forming the structure shown in FIG. 9C.

Figure 9D:
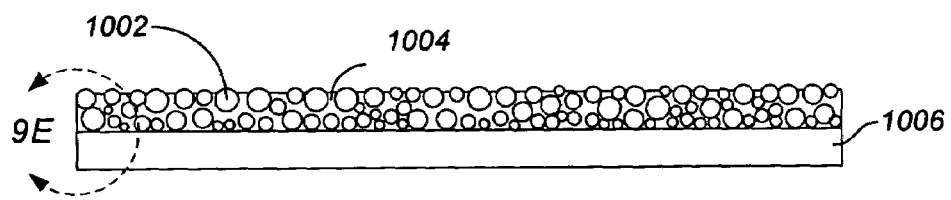
Figure 9E:
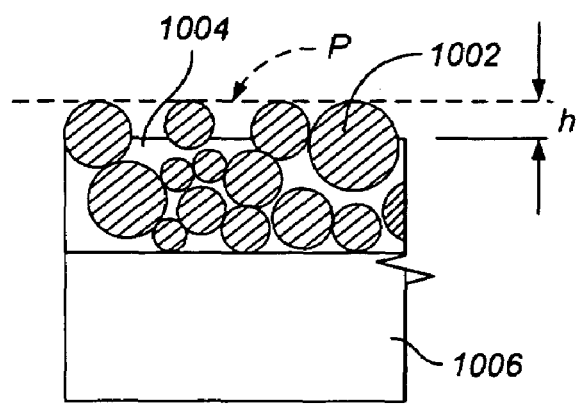

As shown in FIGS. 9D and 9E, after curing the adhesive layer, adhesive 1004 adjacent the surface 1012 is removed by employing any of the dry, wet or mechanical etching or removing methods to remove or lower the surface of the adhesive down to a desired "h" distance and consequently free the contact plane of the hard elements off any adhesive. The dry etching may be carried out using a plasma or other oxidizing atmosphere. The wet etch may use any chemical solutions that may dissolve the adhesive material. In the wet etching, chemical solution may be selectively applied using a sponge like medium and only to the top surface. Finally, mechanical removal may be performed using brush like tools, such as steel brushes, to remove the adhesive only from the top region as shown in FIG. 9D. FIG. 9E shows a section of the structure in FIG. 9D. It is seen that in the resulting structure that the tops uppermost ends of the hard elements form the contact plane P, and the adhesive is removed from the top by an amount "h".

Figure 10A:
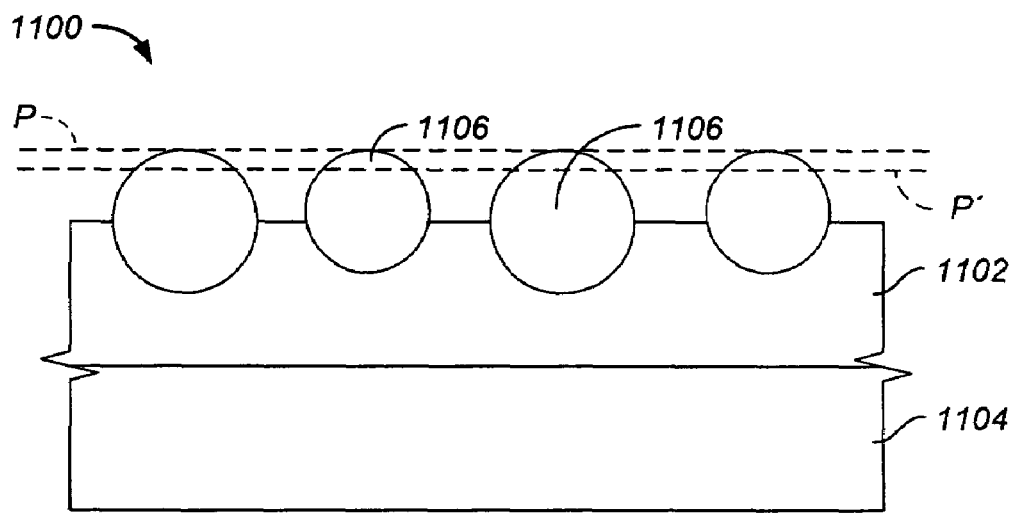
FIGS. 10A-10B and 11A-11B illustrate further process steps that can be used in making a WSID according to the invention.
Figure 10B:
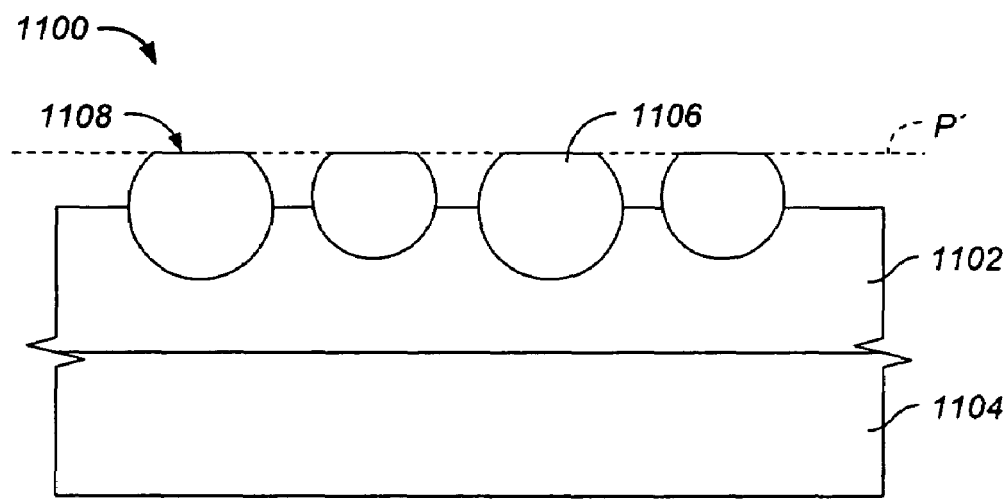

As shown in FIGS. 10A-10B, once the manufacturing process is finalized, a polishing process may be applied to the top surface so as to smooth the uppermost surfaces of the hard elements. FIG. 10A shows a top layer 1100 having an adhesive layer 1102 formed on a support layer 1104. Hard elements 1106 are attached to the adhesive layer 1102 and their uppermost ends are substantially leveled along the contact plane P, as described in the above manufacturing methods. In a subsequent step, uppermost surfaces of the hard elements 1106 may be polished down to produce a smooth contact surface for the hard elements. As shown in FIG. 10B, smoothening process generates contact surfaces 1108 on hard elements 1106. Contact surfaces 1108 of the hard elements 1106 are leveled with the new contact plane P'. Smoothed contact surfaces of the hard elements enhance the polishing ability of the hard elements and increases the polishing surface area. Further, the smoothening operation eliminates surface imperfections of the hard elements, if any.

The smoothening process may be performed by polishing the hard elements 1106 using an abrasive surface or fine abrasive particles having a hardness value which may be equal or higher than the hardness value of the hard elements, for example diamond abrasives. If for example 0.1 micron size diamond particles are used to polish the tops of the hard elements in FIG. 10A the finished contact surface 1108 in FIG. 10B may have approximately less than 0.1 micron surface finish.

It is noted that it is desirable to have the amount of material removed from the hard elements be as minimal as possible. Thus, FIG. 10B illustrates the removal process, but does so using a drawing that purposefully exaggerates the amount of material removed from various hard elements. As more material is removed, the angle of the outer surface of the hard element to the plane (and thus the front surface of the workpiece) increases. It is desirable that this angle be less than 45 degrees, and it is preferred that this angle is about 0 to 30 degrees, for most of the hard elements that make up the WSID. In order to effectuate this, it is further preferred to have the hard elements that are at the surface to have a round or convex outer surface, since this will assist in minimizing outer surface angles that have a large outer surface angle as described above. For very small size hard elements (e.g. submicron size), however, shapes do not have to be rounded.

Figure 11A:
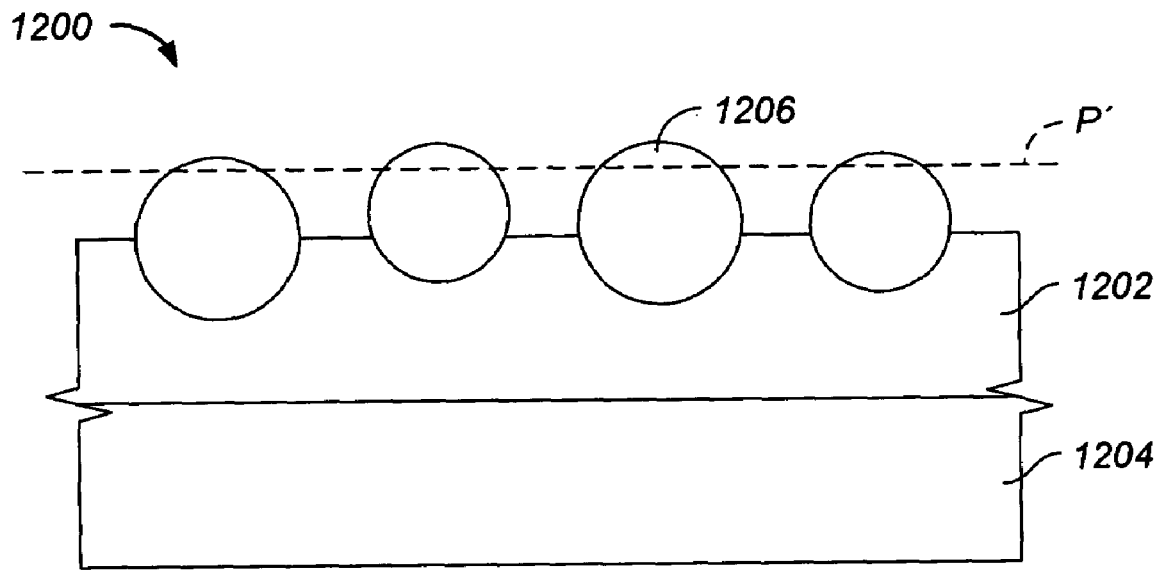
Figure 11B:
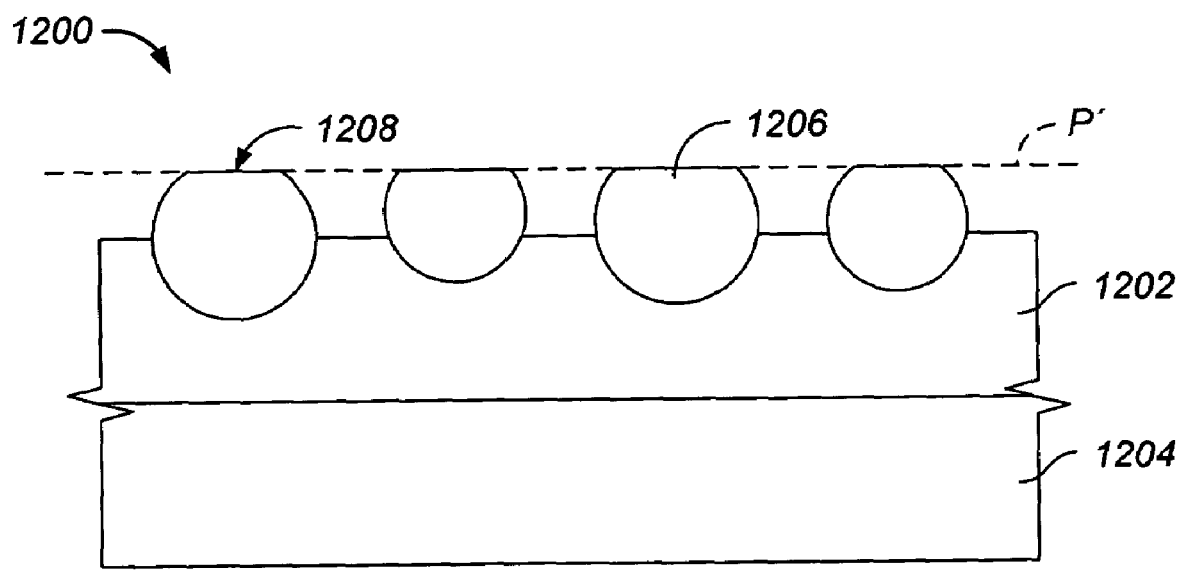

As illustrated in FIGS. 11A-11B, similarly, the above process may be used to level the tops or uppermost ends of the hard elements while producing smooth contact surfaces for them. FIG. 11A shows a top layer 1200 having an adhesive layer 1202 disposed on a support layer 1204. As shown in FIG. 11A, hard elements 1206 in the top layer 1200 are not leveled, i.e., after the disposing the hard elements on the adhesive layer, the top layer is not compressed between two parallel surfaces during the manufacturing. A smoothening process, as described above, not only produces smooth contact surfaces 1208 for the hard elements but also levels the contact surfaces along a contact plane P'. This way the manufacturing process that requires absolute leveling of the tops of the hard elements may be relaxed and leveling can be achieved after manufacturing the top layer.

As shown in FIGS. 12A-12G, in an alternative top layer manufacturing method, initially, a leveling piece 1300 or a block with a flat surface 1302 is provided. The leveling piece may be a glass or plastic, or the like material, substrate with a flat surface. A removable layer 1304 or film is deposited on the flat surface 1302. The removable layer is comprised of a first adhesive material. In one embodiment, the first adhesive material is preferably selected from the adhesives that are in liquid form during the deposition onto the leveling piece, and soft after the deposition as well as transformed in a hard or gel-like structure when cured. Examples of common materials used as the first adhesive material include, but are not limited to, epoxy, sodium silicate solutions, and water-soluble resins or paints.

Figure 12A:
FIGS. 12A-12G illustrate alternate process steps to manufacture a WSID according to the invention.
Figure 12B:
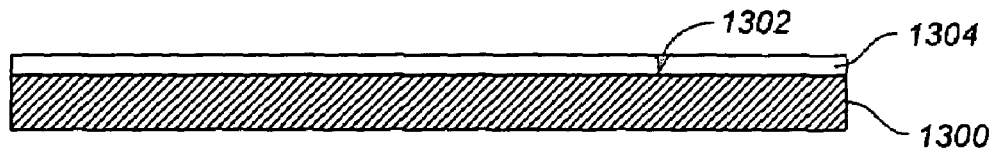
Figure 12C:
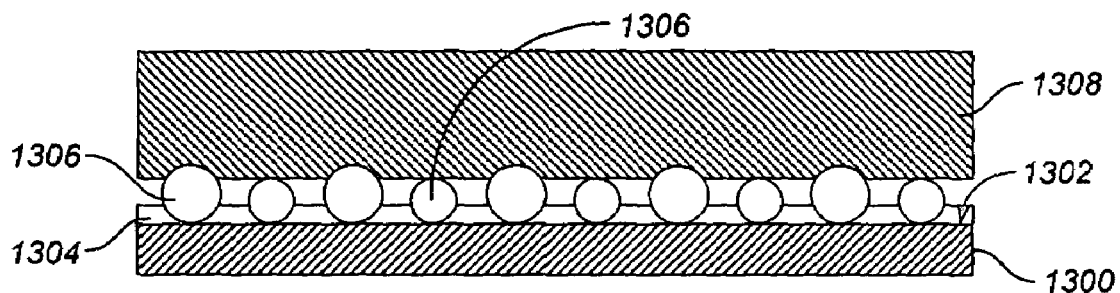

After the formation of the removable layer 1304 on the flat surface 1302, as shown in FIG. 12C, at a leveling step, hard elements 1306 are placed on the removable layer 1304 and compressed by a pusher block 1308 to level the hard elements 1306 on the flat surface 1302. The pusher block may be made of a hard but slightly compressible material such as hard rubber to exert downward force on hard elements of all sizes. The hard elements 1306 may be placed on the leveling layer as a single blanket layer or patterned through a mask or mold that has a desired WSID opening pattern, as described in the previous embodiments. With the applied force from the pusher block, hard elements 1306 are pressed into the removable layer and level across the flat surface 1302. Somewhat flexible nature of the pusher block 1308 enables a bottom surface 1310 of the pusher block to touch and push hard elements with varying sizes.

Figure 12D:
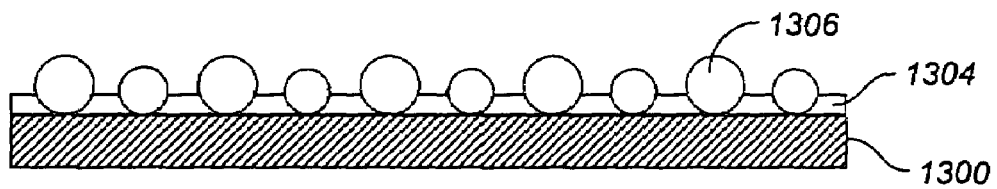
Figure 12E:
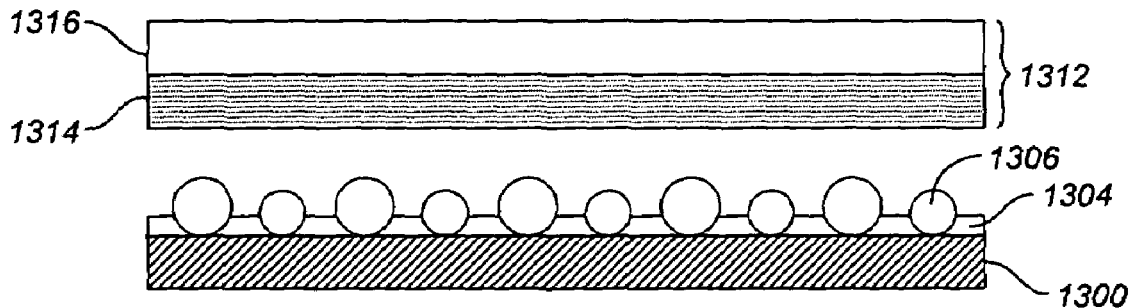

As shown in FIG. 12D, after the application of pusher block 1308, the structure shown in FIG. 12D is cured to secure hard elements 1306 in removable layer 1304. The removable layer preferably has a thickness which is less than or equal to the average radius of the hard elements so that the top surfaces of the hard elements shown in FIG. 12D are free of any residue of the removable layer. As shown in FIG. 12E, after curing the removable layer 1304, a top layer structure comprising an adhesive layer 1314 which is disposed on a support layer 1316 is placed on the structure shown in FIG. 12D so that the adhesive layer 1314 faces the exposed surfaces of the hard elements. Alternatively, the adhesive layer 1314 may be applied onto the hard elements 1306. The thickness of the adhesive layer 1314 is sufficient to immerse hard elements 1306. Following this, the support layer 1316 is then applied on top of the adhesive layer 1314. The adhesive and support layers are described in the previous embodiments. At this stage of the process the adhesive layer is not cured.

Figure 12F:
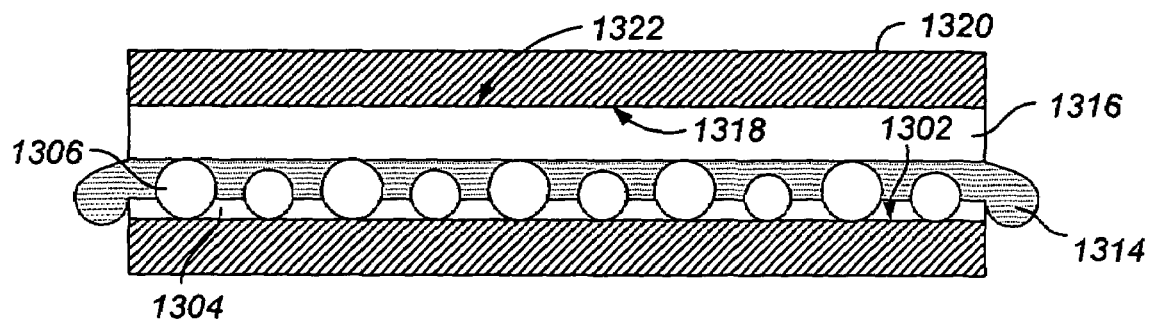
Figure 12G:
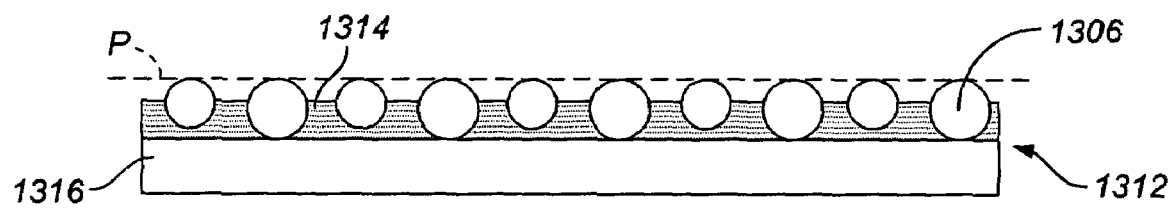

As shown in FIG. 12F, after placing the top layer 1312 on the exposed portions of the hard elements, a flat surface 1318 of another leveling piece 1320 is placed on back surface 1322 of the support layer and pressed against the hard elements 1306. The flat surfaces 1302 and 1318 are substantially parallel to one another. Under pressure, the adhesive layer 1314 fills the space between the hard elements 1306 and covers their exposed surfaces and exposed surface of the removable layer 1304. Excess adhesive layer material is oozed out from the sides and removed. The surfaces of the hard elements embedded into the removable layer are protected from the adhesive material by the removable layer 1304. As shown in FIG. 12G, after curing the adhesive layer 1304, the removable layer 1302 is removed using a solvent that does not dissolve the adhesive layer. In the resulting top surface 1312 shown in FIG. 12G, upper most ends of the hard elements are leveled across the same contact plane P, and the top surfaces of the hard elements are free of any polymeric material such as an adhesive material.

It should be noted that the top layer structures shown in FIGS. 7A-7F, 4A, 8F, 9D, 12G all have the support layer. However, the present invention would work without the support layer if the hard elements and the adhesive layer form in themselves a strong enough film structure. One way of obtaining such a structure is to use a support layer that does not adhere well to the adhesive layer so that it can be peeled off after the top layer structures of the above figures are fabricated.

In an alternative embodiment, the removable layer 1304 may be made of a second adhesive material which may demonstrate different characteristics than the first adhesive material. For example, the second adhesive material may be selected from the materials that may or may not be in liquid form when deposited. It may harden quickly after the leveling step shown in FIG. 12C. In a specific case, the second adhesive material may be the same material used for the adhesive layer 1314. In this case the process steps illustrated between FIGS. 12C and 12F are performed with the removable layer 1304 being made of the same material as the adhesive layer. Therefore, after the step of FIG. 12F the removable layer and the adhesive layer may merge without an interface separating the two, and form a single phase layer burying the hard elements. After curing, at the process step shown in FIG. 12G, any desired amount of the single phase layer may be removed to expose uppermost end of the hard elements. Removal of the single phase layer can be achieved by plasma etching, reactive ion etching, chemical etching and other removal techniques. It is also possible to use a mechanical polishing step that would remove the single-phase layer material but cannot polish the hard elements. At the end of the process uppermost ends of the hard elements are leveled across the same contact plane P, and the top surfaces of the hard elements are free of removable layer materials.

Present invention may be used by replacing the adhesive layer by another layer that may be deposited by vapor deposition techniques. One such material is parylene. In this case the structure shown in FIG. 12F is made without the adhesive layer. The sandwich structure is then loaded into a vacuum chamber and parylene is deposited. Parylene deposits into all the openings including the gap between the support layer and the hard elements and the removable layer, forming a film that holds the hard elements. Structure shown in 12G is then obtained where the adhesive layer is replaced by parylene. Alternately parylene may be also peeled off the support layer 1316, acting itself as a support layer for the hard elements.

Figure 13A:
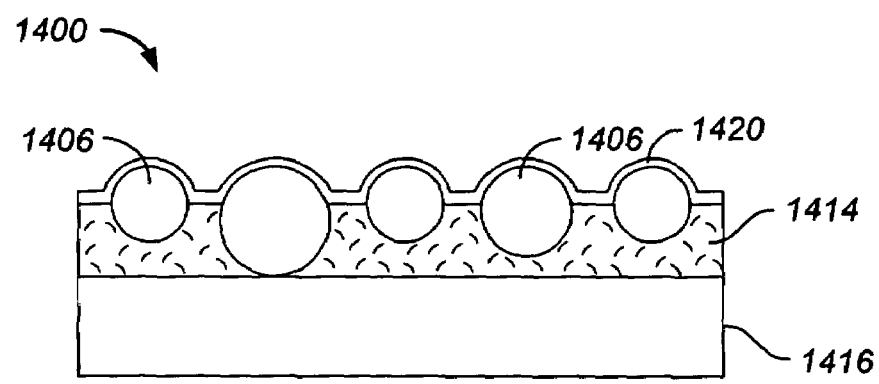
FIGS. 13A and 13B illustrate top layers coated with a protective film.
Figure 13B:
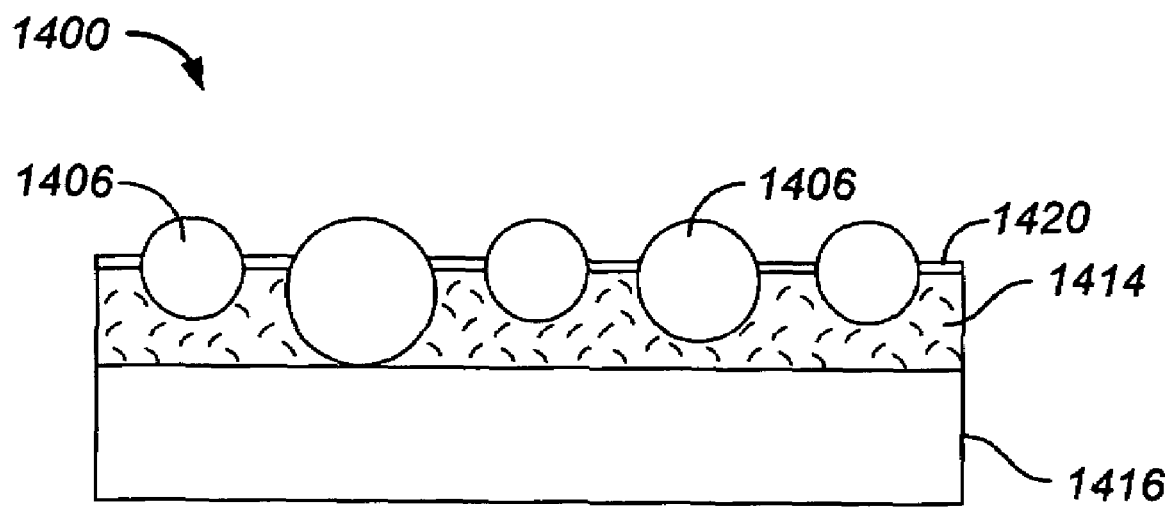

In yet another alternative embodiment, after the manufacturing of top layer of the WSID, which is described with different embodiments above and shown in FIGS. 8A through 12G, the top layer is coated with a film, preferably a thin film. The film may be a hard and electrically insulating film which may serve as a barrier layer between the adhesive layer and the environment to reduce the degradation of the adhesive layer that is caused by the harmful effects of the process environment such as effects of plating baths acids and solvents. An example of this embodiment can be described in connection with FIG. 13A which shows a top layer 1400 of a WSID. The top layer has a plurality of hard elements 1406 held by an adhesive layer 1414 which is disposed on a support layer 1416. The exposed portions of the hard elements and the adhesive layer is coated with a hard material coating or film 1420, which can be used for polishing and/or to assist in preventing the adhesive layer 1414 from shedding during processing. The film may include, but not limited to, silicon nitride, silicon oxide and diamond like carbon (DLC) and the like materials. The thickness range of the film 1420 may be between 100 nanometers to 10 microns. The embodiment illustrated in FIG. 13B is similar to that described in FIG. 13A, except that the film 1420 is disposed over the adhesive layer 1414, but not the hard elements 1406.

It should be understood, of course, that the foregoing relates to preferred embodiments of the invention and that modifications may be made without departing from the spirit and scope of the invention.

What is claimed is:

1. An electrochemical mechanical processing pad having a top layer, the top layer comprising:
    a flexible support, wherein the flexible support comprises a plurality of channels adapted to allow a solution to flow therethrough; and
    a plurality of hard elements permanently fixed in a binder, the binder shaped to have a plurality of protrusions each having a top surface, the hard elements fixed in the top surfaces of the plurality of protrusions and, as manufactured, forming a substantially planar contact surface adapted to contact a conductive layer of a wafer, the binder disposed below the contact surface, the hard elements substantially uniformly distributed across the flexible support, the plurality of protrusions positioned and spaced apart from one another such that only the hard elements are configured to contact a conductive layer of a wafer during relative movement and physical contact between the top layer and the conductive layer, wherein the binder comprises a plurality of channels disposed between the protrusions and adapted to allow the solution to flow therethrough.

2. The pad according to claim 1, wherein the protrusions and the hard elements are configured such that, during electrochemical mechanical processing of a conductive layer, the hard elements are substantially the only material touching the conductive layer.

3. The pad according to claim 1 wherein the binder and the flexible support are formed of the same material.

4. The pad according to claim 3 wherein the binder and the flexible support each comprise a polymeric material.

5. The pad according to claim 1, wherein a plurality of contact surfaces are formed and are configured to contact a conductive layer of a wafer at the same time, and wherein the flexible support is adapted to provide vertical movement of one of the contact surfaces without a corresponding vertical movement of an another contact surface that is at least further than a maximum feature width on said wafer.

6. The pad according to claim 1, wherein the contact surface of the hard elements are substantially co-planar.

7. The pad according to claim 6, wherein the contact surface of the hard elements is flat.

8. The pad according to claim 6, wherein the contact surface of the hard elements is rounded.

9. The pad according to claim 6, wherein a shape of the contact surface of the hard elements is random.

10. The pad according to claim 1, wherein each of the hard elements is made of ceramic material.

11. The pad according to claim 1, wherein each of the hard elements is made substantially of zirconia.

12. The pad according to claim 1, wherein each of the hard elements is substantially spherical in shape with a diameter of less than 500 microns.

13. The pad according to claim 1, wherein the pad is adapted to be used during an electrochemical mechanical deposition process.

14. The pad according to claim 1, wherein the pad is adapted to be used during an electrochemical mechanical polishing process.

15. The pad according to claim 1, further including a hard material coating disposed over the binder to assist in preventing the binder from shedding onto the conductive surface.

16. The pad according to claim 15, wherein the hard material coating comprises metal.

17. The pad according to claim 15, wherein the hard material coating comprises an electrically insulating material.

18. The pad according to claim 1, wherein the channels of the flexible support are substantially aligned with the channels of the binder.

19. The pad according to claim 1, wherein the channels of the flexible support are arranged in a cross-hatch configuration with the channels of the binder.

20. The pad according to claim 1, wherein the channels of the flexible support are arranged in a mesh configuration with the channels of the binder.

21. The pad according to claim 1, further comprising other hard elements disposed below the top surface of the protrusions.

22. The pad according to claim 1, wherein the protrusions are substantially parallel.

23. The pad according to claim 1, wherein the protrusions are spaced apart by about 0.01 mm to 2 mm.

24. The pad according to claim 1, wherein the protrusions are spaced apart by about 0.05 mm to 0.2 mm.

25. The pad according to claim 1, wherein the protrusions include a plurality of shapes.

26. The pad according to claim 1, wherein the hard elements have a diameter between about 0.005 mm and 0.5 mm.

27. The pad according to claim 1, wherein the hard elements have a diameter between about 0.05 mm and 0.3 mm.

28. An electrochemical mechanical processing pad having a top layer, the top layer comprising:
- a flexible support, wherein the flexible support comprises a plurality of channels adapted to allow a solution to flow therethrough;
- a plurality of hard elements permanently fixed in a binder, the binder shaped to have a plurality of protrusions each having a top surface, the hard elements fixed in the top surfaces of the plurality of protrusions and, as manufactured, forming a substantially planar surface, the binder disposed below the planar surface, the hard elements substantially uniformly distributed across the flexible support, wherein the binder comprises a plurality of channels disposed between the protrusions and adapted to allow the solution to flow therethrough; and
- a hard material coating disposed over the hard elements and the binder, thereby creating a contact surface of the hard material coating at locations corresponding to the planar surface, the contact surface adapted to contact a conductive layer of a wafer, wherein the plurality of protrusions are positioned and spaced apart from one another such that only the hard material coating over the hard elements is configured to contact a conductive layer of a wafer during relative movement and physical contact between the top layer and the conductive layer.

29. The pad according to claim 28, wherein the binder and the flexible support are formed of the same material.

30. The pad according to claim 28, wherein a plurality of contact surfaces are formed and are configured to contact a conductive layer of a wafer at the same time, and wherein the flexible support is adapted to provide vertical movement of one of the contact surfaces without a corresponding vertical movement of an another contact surface that is at least further than a maximum feature width on said wafer.

31. The pad according to claim 28, wherein the pad is adapted to be used during an electrochemical mechanical deposition process.

32. The pad according to claim 28, wherein the pad is adapted to be used during an electrochemical mechanical polishing process.

33. The pad according to claim 28, wherein the hard material coating comprises metal.

34. The pad according to claim 28, wherein the hard material coating comprises an electrically insulating material.

35. The pad according to claim 34, wherein the electrically insulating material comprises silicon nitride, silicon oxide, or diamond-like carbon.

36. The pad according to claim 28, wherein the hard material coating has a thickness between about 100 nm and 10 μm.

37. The pad according to claim 28, wherein the channels of the flexible support are substantially aligned with the channels of the binder.

38. The pad according to claim 28, wherein the channels of the flexible support are arranged in a cross-hatch configuration with the channels of the binder.

39. The pad according to claim 28, further comprising other hard elements disposed below the top surface of the binder.

40. The pad according to claim 28, wherein the protrusions include a plurality of shapes.

41. The pad according to claim 28, wherein the protrusions are substantially parallel.

* * * * *